US012792631B2

(12) United States Patent
Creanga et al.

(10) Patent No.: US 12,792,631 B2
(45) Date of Patent: *Nov. 10, 2026

(54) PARTITIONING DATA IN A VERSIONED DATABASE

(71) Applicant: KINAXIS INC., Ottawa (CA)

(72) Inventors: Marin Creanga, Ottawa (CA); Dylan Ellicott, Ottawa (CA)

(73) Assignee: Kinaxis Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 19/244,583

(22) Filed: Jun. 20, 2025

(65) Prior Publication Data

US 2025/0315445 A1 Oct. 9, 2025

Related U.S. Application Data

(63) Continuation of application No. 18/392,558, filed on Dec. 21, 2023, now Pat. No. 12,488,021, which is a (Continued)

(51) Int. Cl.
*G06F 16/27* (2019.01)
*G06F 16/21* (2019.01)

(52) U.S. Cl.
CPC .......... *G06F 16/278* (2019.01); *G06F 16/219* (2019.01)

(58) Field of Classification Search
None
See application file for complete search history.

(56) References Cited

U.S. PATENT DOCUMENTS 6,125,371 A * 9/2000 Bohannon ............. G06F 16/219
707/999.203
7,499,960 B2 3/2009 Dageville et al.
(Continued)

OTHER PUBLICATIONS

Cooperman et al.; "Memory-Based and Disk-Based Algorithms for Very High Degree Permutation Groups"; ISSAC, Aug. 3-6, 2003, 8 pages.
(Continued)

*Primary Examiner* — Yu Zhao
(74) *Attorney, Agent, or Firm* — Ruggiero McAllister & McMahon LLC

(57) ABSTRACT

Systems, methods, and computer program products for deleting data in a versioned database, generating, by a processor, a version visibility data structure (VVDS) for the versioned database that maps a version to a respective Version Scenario List (VSL) from a version graph and scenario structure of the versioned database. Generating the VVDS comprises initializing the VVDS by setting a unique version as a key to an entry of the VVDS, and a respective empty VSL in the entry; accessing the respective Scenario Version List (SVL); and iterating, each entry in the VVDS from the list of all scenarios in the database and the respective SVL until there are no more unprocessed scenarios. The method includes using the generated VVDS to determine each combination of feasible scenarios that when deleted, delete memory; computing an amount of memory reclaimed by deleting each combination of feasible scenarios; and deleting one or more combinations of the computed scenarios to free up a specific amount of memory in the versioned database memory.

20 Claims, 13 Drawing Sheets

Related U.S. Application Data continuation-in-part of application No. 18/345,420, filed on Jun. 30, 2023, now Pat. No. 12,579,105.

(60) Provisional application No. 62/435,076, filed on Dec. 23, 2022, provisional application No. 63/357,287, filed on Jun. 30, 2022.

(56) References Cited

U.S. PATENT DOCUMENTS

| | | | |
|---|---|---|---|
| 8,005,872 | B2 | 8/2011 | Bhattacharjee et al. |
| 8,386,501 | B2 | 2/2013 | Cahill et al. |
| 8,694,985 | B2 | 4/2014 | Flisakowski et al. |
| 8,832,677 | B2 | 9/2014 | Flisakowski et al. |
| 9,015,177 | B2 | 4/2015 | Cahill et al. |
| 9,104,600 | B2 | 8/2015 | King et al. |
| 9,262,331 | B2 | 2/2016 | Declercq et al. |
| 9,262,332 | B2 | 2/2016 | Declercq et al. |
| 10,042,910 | B2 | 8/2018 | Bensberg et al. |
| 11,157,517 | B2 | 10/2021 | Mandadi et al. |
| 12,008,006 | B1 | 6/2024 | Beveridge |
| 2003/0005464 | A1 | 1/2003 | Gropper et al. |
| 2006/0206507 | A1 | 9/2006 | Dahbour |
| 2009/0271763 | A1* | 10/2009 | Varma .................. G06F 12/145 717/114 |
| 2010/0312754 | A1 | 12/2010 | Bear et al. |
| 2012/0066228 | A1 | 3/2012 | Charboneau |
| 2013/0238657 | A1 | 9/2013 | Brand |
| 2013/0262403 | A1 | 10/2013 | Milousheff et al. |
| 2016/0132804 | A1 | 5/2016 | Croft |
| 2016/0350368 | A1 | 12/2016 | Weyerhaeuser et al. |
| 2019/0227877 | A1 | 7/2019 | Pandey et al. |
| 2020/0226029 | A1 | 7/2020 | Borate et al. |
| 2021/0271559 | A1 | 9/2021 | LeCrone |

OTHER PUBLICATIONS

GeeksforGeeks; “Count all possible paths between two vertices”, Dec. 12, 2021, 17 pages.

Needham et al.; “Chapter 4. Pathfinding and Graph Search Algorithms”, 2019, 69 pages.

Vorwerk; “Calculate reclaimable space before deleting Snapshot copies”, Nov. 2, 2021, 1 page.

* cited by examiner

PARTITIONING DATA IN A VERSIONED DATABASE

The present application claims the benefit of U.S. Provisional Patent Application No. 63/435,076 having the same title and filed Dec. 23, 2022, expressly incorporated by reference in its entirety herein. The present application also claims the benefit of U.S. Provisional Patent Application No. 63/357,287 entitled Deleting Data in a Versioned Database, filed Jun. 30, 2022, which is also expressly incorporated by reference in its entirety herein. The present application is a continuation of U.S. Ser. No. 18/392,558 having the same title and filed on Dec. 21, 2023, which in turn is a continuation-in-part of U.S. Ser. No. 18/345,420 entitled Deleting Data in a Versioned Database filed Jun. 30, 2023, the entirety of each which is expressly incorporated by reference herein.

BACKGROUND

A versioned database is a database in which record data exists in different versions. Depending on which version a query is triggered on, the query results can vary substantially. Furthermore, a scenario can be defined as a pointer to a version. In some systems, a user executes a query on a scenario and not directly on a version. Data can be unique to a version. Deleting the scenario only deletes the pointer to the version, the underlying data remains unchanged. Data can be shared between two or more scenarios. In other words, two or more scenarios can 'see' the same data. Deleting a single scenario will not free up shared data since the other scenarios still require the shared data.

An issue faced by database administrators is how can the memory footprint of a database be decreased by deleting scenarios?A common experience is that the database administrator deletes scenarios that are not used, only to find out that no memory has been reclaimed (due to data sharing between scenarios).

As an example, consider the insertion of 1 billion records in a parent scenario. One child is created, followed by modification of one of these records. In the parent, a record is modified. Deletion of the child scenario frees up 1 record worth of memory. Deletion of the parent scenario (without the child) frees up 1 record worth of memory. Deletion of both the parent and child scenarios removes all 1 billion, plus two records. How would the administrator know the above information without knowing the insertion sequence?

One simple approach is as follows. Given three scenarios (A, B, C), evaluate all possible combinations of deletions and follow up as needed. The Example outcome is summarized as:

| Scenarios to delete | Memory reclaimed if scenarios deleted |
|---|---|
| A | x MB |
| AB | x MB |
| ABC | x MB |
| AC | x MB |
| BC | x MB |
| B | x MB |
| C | x MB |

However, if there were, for example 50 scenarios, there would be multiple trillions of possible combinations.

BRIEF SUMMARY

Disclosed herein are systems and methods that use a version graph and scenario structure, in order to determine the best combination of scenarios that, once deleted, can reclaim any memory.

Once all the feasible combinations are determined, the amount of memory reclaimed per combination can be evaluated.

Disclosed herein are systems and methods in which the total number of combinations is the maximum number of versions in the database. This approach determines which scenarios need to be deleted to free up a particular version (for example: which scenarios need to be deleted to free up version number 1).

Given a set of scenarios (which is guaranteed to free up memory), systems and methods as described herein can compute the amount of memory that set would free up once it is fully deleted.

In one aspect, described is a computer-implemented method for deleting data in a versioned database. The method includes generating, by a processor, a version visibility data structure (VVDS) for the versioned database that maps a version to a respective Version Scenario List (VSL) from a version graph and scenario structure of the versioned database, the VSL comprising a list of scenarios in the database that have access to a specific version in the versioned database memory, wherein each scenario is a logical pointer in the database that is independent of and points to the version in the database. Generating the VVDS comprises initializing, by the processor, the VVDS by setting a unique version as a key to an entry of the VVDS, and a respective empty VSL in the entry; accessing, by the processor, the respective Scenario Version List (SVL); and iterating, by the processor, each entry in the VVDS from the list of all scenarios in the database and the respective SVL until there are no more unprocessed scenarios. The method includes using the generated VVDS to determine, by the processor, each combination of feasible scenarios that when deleted, delete memory; computing, by the processor, an amount of memory reclaimed by deleting each combination of feasible scenarios; and deleting, by the processor, one or more combinations of the computed scenarios to free up a specific amount of memory in the versioned database memory. The initializing, by the processor, the VVDS by setting a unique version as a key to an entry of the VVDS and generating the VVDS can comprise, for a list of all versions in the database, marking the list of all versions in the database as unprocessed; (a) selecting one of the unprocessed versions from the list of all versions as the key to the entry into the VVDS, and the empty VSL in the entry; (b) marking the selected unprocessed version as processed; and repeating (a) and (b) until there are no more unprocessed versions from the list of all versions.

The computer-implemented method can also include the iterating, by the processor, each entry in the VVDS from the list of all scenarios in the database and the respective SVL until there are no more unprocessed scenarios comprising: for the list of all scenarios in the database and the respective SVL, marking the list of all scenarios in the database as unprocessed; (a) selecting an unprocessed scenario from the list of all scenarios in the respective SVL; (b) marking all the versions in the respective SVL as unprocessed; and (c) identifying and adding entries in the VVDS that correspond to the unprocessed versions from the respective SVL until all the scenarios from the list of scenarios are processed. The identifying and adding entries in the VVDS that correspond to the unprocessed versions from the respective SVL until all the scenarios from the list of scenarios are processed can comprise: (c1) selecting an unprocessed version from the respective SVL; (c2) identifying the entry in the VVDS that corresponds to the selected unprocessed version; (c3) adding the entry in the VVDS that corresponds to selected unprocessed scenario into the VSL entry of the VVDS; (c4) marking the selected unprocessed version as processed; and (c5) repeating (c1) through (c4) until there are no more unprocessed versions in the respective scenario's SVL; (c6) marking the selected scenario as processed; and repeating (c5) and (c6) until there are no more unprocessed scenarios.

The computer-implemented method can comprise determining each combination of feasible scenarios comprising, for each entry in the VVDS, obtaining, by the processor, a combination of scenarios in the VSL of each entry. Determining each combination of feasible scenarios for each entry in the VVDS can further comprise: (a) marking each entry in the VVDS as unprocessed; (b) selecting an unprocessed entry in the VVDS that has a version and the respective VSL, wherein the VSL corresponding to the unprocessed entry is a feasible combination of scenarios that deletion of which can reclaim memory; (c) aggregating the feasible combinations into a combination list; (d) marking the selected entry in the VVDS as processed; (e) repeating (a) through (d) until each entry in the VVDS is processed; and returning a list of the feasible combinations.

The computer-implemented method can include the computing, by the processor, an amount of memory reclaimed by deleting each combination of feasible scenarios comprising: generating the VVDS for a set of scenarios; marking all entries in the VVDS as unprocessed, selecting an unprocessed entry of the VVDS; marking all the scenarios in the corresponding VSL as unprocessed; selecting each unprocessed scenario within the VSL; determining if each unprocessed scenario in the VSL is in the set of scenarios in the VVDS until there are no further scenarios to process from the corresponding VSL; determining by the processor, an amount of memory used by the corresponding version; processing and determining the amounts of memory from the remaining unprocessed VVDS entries until all of the VVDS entries are processed; and returning an accumulated memory accumulated from the determined amounts of memory.

In one aspect, a system for deleting data in a versioned database includes a processor. The system also includes a memory storing instructions that, when executed by the processor, configure the system to generate, by the processor, a version visibility data structure (VVDS) for the versioned database that maps a version to a respective Version Scenario List (VSL) from a version graph and scenario structure of the versioned database, the VSL comprising a list of scenarios in the database that have access to a specific version in the versioned database memory, wherein each scenario is a logical pointer in the database that is independent of and points to the version in the database. When generating the VVDS, the system is configured to initialize, by the processor, the VVDS by setting a unique version as a key to an entry of the VVDS, and a respective empty VSL in the entry; access, by the processor, a respective Scenario Version List (SVL); and iterate, by the processor, each entry in the VVDS from the list of all scenarios in the database and the respective SVL until there are no more unprocessed scenarios. The system is configured to use the generated VVDS to determine, by the processor, each combination of feasible scenarios that when deleted, delete memory; compute, by the processor, an amount of memory reclaimed by deleting each combination of feasible scenarios; and delete, by the processor, one or more combinations of the computed scenarios to free up a specific amount of memory in the versioned database memory.

The system can also be configured so that for the initialization, by the processor, the VVDS by setting a unique version as a key to an entry of the VVDS and generating the VVDS can, the system can be configured to: for a list of all versions in the database mark the list of all versions in the database as unprocessed; (a) select one of the unprocessed versions from the list of all versions as the key to the entry into the VVDS, and the empty VSL in the entry; (b) mark the selected unprocessed version as processed; and repeating (a) and (b) until there are no more unprocessed versions from the list of all versions.

The computer-implemented system can be configured to include, when iterating, by the processor, each entry in the VVDS from the list of all scenarios in the database and the respective SVL until there are no more unprocessed scenarios: for the list of all scenarios in the database and the respective SVL, mark the list of all scenarios in the database as unprocessed; (a) select an unprocessed scenario from the list of all scenarios in the respective SVL; (b) mark all the versions in the respective SVL as unprocessed; and (c) identify and adding entries in the VVDS that correspond to the unprocessed versions from the respective SVL until all the scenarios from the list of scenarios are processed. When identifying and adding entries in the VVDS that correspond to the unprocessed versions from the respective SVL until all the scenarios from the list of scenarios are processed, the system is further configured to: (c1) select an unprocessed version from the respective SVL; (c2) identify the entry in the VVDS that corresponds to the selected unprocessed version; (c3) add the entry in the VVDS that corresponds to selected unprocessed scenario into the VSL entry of the VVDS; (c4) mark the selected unprocessed version as processed; and (c5) repeat (c1) through (c4) until there are no more unprocessed versions in the respective scenario's SVL; (c6) mark the selected scenario as processed; and repeat (c5) and (c6) until there are no more unprocessed scenarios.

The computer-implemented system can be configured so that the determining, by the processor, each combination of feasible scenarios comprises: for each entry in the VVDS, obtain, by the processor, a combination of scenarios in the VSL of each entry. For determining each combination of feasible scenarios for each entry in the VVDS, the system can be further configured to: (a) mark each entry in the VVDS as unprocessed; (b) select an unprocessed entry in the VVDS that has a version and the respective VSL, wherein the VSL corresponding to the unprocessed entry is a feasible combination of scenarios that deletion of which can reclaim memory; (c) aggregate the feasible combinations into a combination list; (d) mark the selected entry in the VVDS as processed; (e) repeat (a) through (d) until each entry in the VVDS is processed; and return a list of the feasible combinations.

The computer-implemented system can be configured to compute, by the processor, an amount of memory reclaimed by deleting each combination of feasible scenarios, wherein the system can be further configured to: generate the VVDS for a set of scenarios; mark all entries in the VVDS as unprocessed, select an unprocessed entry of the VVDS; mark all the scenarios in the corresponding VSL as unprocessed; select each unprocessed scenario within the VSL; determine if each unprocessed scenario in the VSL is in the set of scenarios in the VVDS until there are no further scenarios to process from the corresponding VSL; determine by the processor, an amount of memory used by the corresponding version; process and determine the amounts of memory from the remaining unprocessed VVDS entries until all of the VVDS entries are processed; and return an accumulated memory accumulated from the determined amounts of memory.

In one aspect, a non-transitory computer-readable storage medium, the computer-readable storage medium including instructions that when executed by a computer, cause the computer to generate, by the processor, a version visibility data structure (VVDS) for the versioned database that maps a version to a respective Version Scenario List (VSL) from a version graph and scenario structure of the versioned database, the VSL comprising a list of scenarios in the database that have access to a specific version in the versioned database memory, wherein each scenario is a logical pointer in the database that is independent of and points to the version in the database. When generating the VVDS, the non-transitory computer-readable storage medium can include computer executable instructions that cause the computer to initialize, by the processor, the VVDS by setting a unique version as a key to an entry of the VVDS, and a respective empty VSL in the entry; access, by the processor, a respective Scenario Version List (SVL); and iterate, by the processor, each entry in the VVDS from the list of all scenarios in the database and the respective SVL until there are no more unprocessed scenarios. The non-transitory computer-readable storage medium can include computer executable instructions that cause the computer to use the generated VVDS to determine, by the processor, each combination of feasible scenarios that when deleted, delete memory; compute, by the processor, an amount of memory reclaimed by deleting each combination of feasible scenarios; and delete, by the processor, one or more combinations of the computed scenarios to free up a specific amount of memory in the versioned database memory.

The non-transitory computer-readable storage medium can include computer executable instructions that cause the computer to, when initializing, by the processor, the VVDS by setting a unique version as a key to an entry of the VVDS and generating the VVDS, for a list of all versions in the database, wherein generating when generating the VVDS, the non-transitory computer-readable storage medium can include computer executable instructions that cause the computer to mark the list of all versions in the database as unprocessed; (a) select one of the unprocessed versions from the list of all versions as the key to the entry into the VVDS, and the empty VSL in the entry; (b) mark the selected unprocessed version as processed; and repeating (a) and (b) until there are no more unprocessed versions from the list of all versions.

The non-transitory computer-readable storage medium can include computer executable instructions that cause the computer to, when iterating, by the processor, each entry in the VVDS from the list of all scenarios in the database and the respective SVL until there are no more unprocessed scenarios: for the list of all scenarios in the database and the respective SVL, mark the list of all scenarios in the database as unprocessed; (a) select an unprocessed scenario from the list of all scenarios in the respective SVL; (b) mark all the versions in the respective SVL as unprocessed; and (c) identify and adding entries in the VVDS that correspond to the unprocessed versions from the respective SVL until all the scenarios from the list of scenarios are processed. When identifying and adding entries in the VVDS that correspond to the unprocessed versions from the respective SVL until all the scenarios from the list of scenarios are processed, the non-transitory computer-readable storage medium can include computer executable instructions that cause the computer to: (c1) select an unprocessed version from the respective SVL; (c2) identify the entry in the VVDS that corresponds to the selected unprocessed version; (c3) add the entry in the VVDS that corresponds to selected unprocessed scenario into the VSL entry of the VVDS; (c4) mark the selected unprocessed version as processed; and (c5) repeat (c1) through (c4) until there are no more unprocessed versions in the respective scenario's SVL; (c6) mark the selected scenario as processed; and repeat (c5) and (c6) until there are no more unprocessed scenarios.

The non-transitory computer-readable storage medium can include computer executable instructions that cause the computer to determine, by the processor, each combination of feasible scenarios comprises: for each entry in the VVDS, obtain, by the processor, a combination of scenarios in the VSL of each entry. For determining each combination of feasible scenarios for each entry in the VVDS, the non-transitory computer-readable storage medium can include computer executable instructions that cause the computer to: (a) mark each entry in the VVDS as unprocessed; (b) select an unprocessed entry in the VVDS that has a version and the respective VSL, wherein the VSL corresponding to the unprocessed entry is a feasible combination of scenarios that deletion of which can reclaim memory; (c) aggregate the feasible combinations into a combination list; (d) mark the selected entry in the VVDS as processed; (e) repeat (a) through (d) until each entry in the VVDS is processed; and return a list of the feasible combinations.

The non-transitory computer-readable storage medium can include computer executable instructions that cause the computer to compute, by the processor, an amount of memory reclaimed by deleting each combination of feasible scenarios, wherein the non-transitory computer-readable storage medium can be configured to cause the computer to: generate the VVDS for a set of scenarios; mark all entries in the VVDS as unprocessed, selecting an unprocessed entry of the VVDS; mark all the scenarios in the corresponding VSL as unprocessed; select each unprocessed scenario within the VSL; determine if each unprocessed scenario in the VSL is in the set of scenarios in the VVDS until there are no further scenarios to process from the corresponding VSL; determine by the processor, an amount of memory used by the corresponding version; process and determine the amounts of memory from the remaining unprocessed VVDS entries until all of the VVDS entries are processed; and return an accumulated memory accumulated from the determined amounts of memory.

Other technical features may be readily apparent to one skilled in the art from the following figures, descriptions, and claims.

The details of one or more embodiments of the subject matter of this specification are set forth in the accompanying drawings and the description below. Other features, aspects, and advantages of the subject matter will become apparent from the description, the drawings, and the claims.

Other technical features may be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 14 illustrates a Version Visibility Data Structure generated from version graph in FIG. 7.

FIG. 13 illustrates a block diagram in accordance with one embodiment.

DETAILED DESCRIPTION

Figure 1:
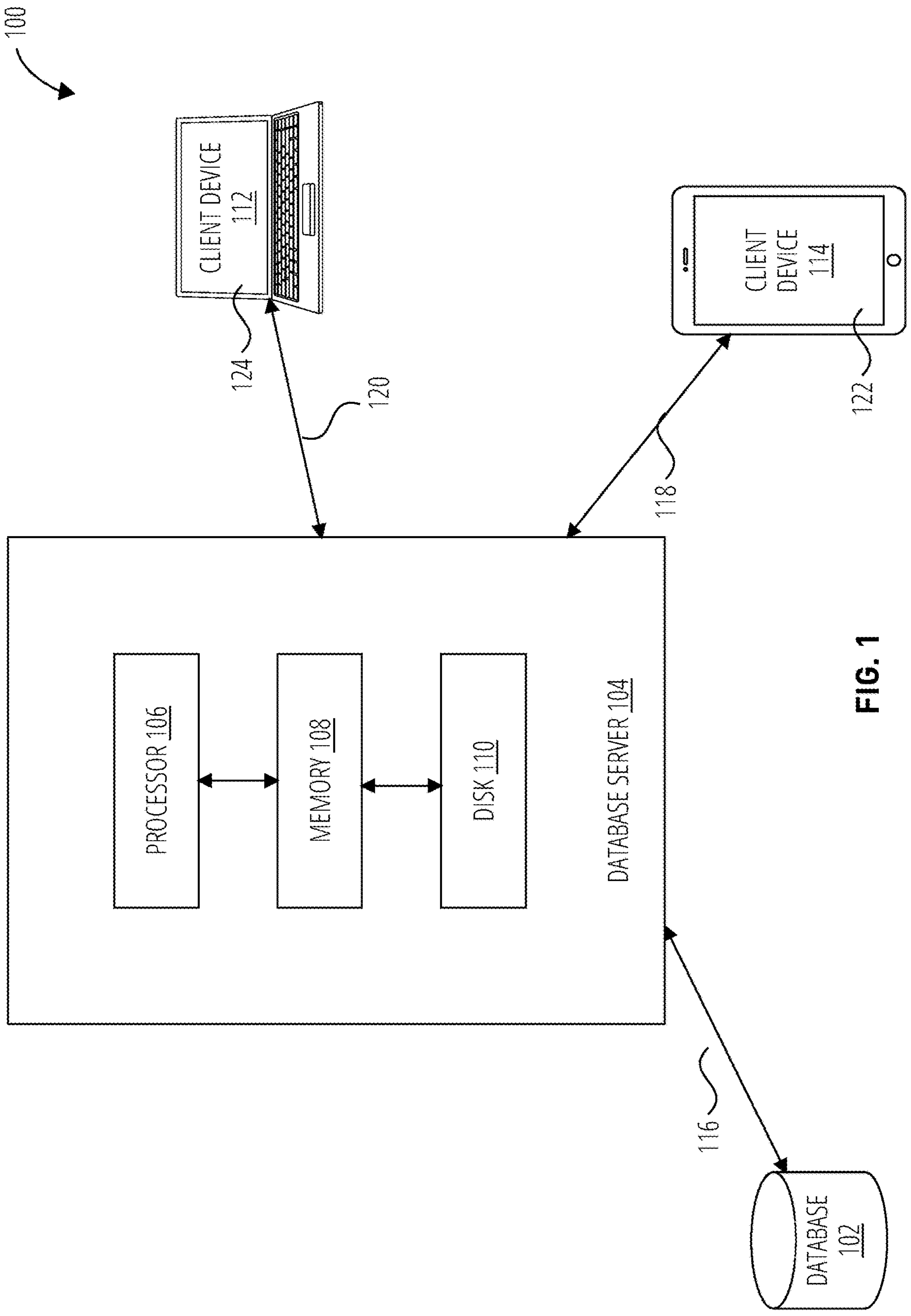
FIG. 1 illustrates an example of a system for partitioning data in a versioned database in accordance with one embodiment.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium can include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

A computer program (which may also be referred to or described as a software application, code, a program, a script, software, a module or a software module) can be written in any form of programming language. This includes compiled or interpreted languages, or declarative or procedural languages. A computer program can be deployed in many forms, including as a module, a subroutine, a standalone program, a component, or other unit suitable for use in a computing environment. A computer program can be deployed to be executed on one computer or can be deployed on multiple computers that are located at one site or distributed across multiple sites and interconnected by a communication network.

As used herein, a “software engine” or an “engine,” refers to a software implemented system that provides an output that is different from the input. An engine can be an encoded block of functionality, such as a platform, a library, an object or a software development kit (“SDK”). Each engine can be implemented on any type of computing device that includes one or more processors and computer readable media. Furthermore, two or more of the engines may be implemented on the same computing device, or on different computing devices. Non-limiting examples of a computing device include tablet computers, servers, laptop or desktop computers, music players, mobile phones, e-book readers, notebook computers, PDAs, smart phones, or other stationary or portable devices.

The processes and logic flows described herein can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows that can be performed by an apparatus, can also be implemented as a graphics processing unit (GPU).

Computers suitable for the execution of a computer program include, by way of example, general or special purpose microprocessors or both, or any other kind of central processing unit. Generally, a central processing unit receives instructions and data from a read-only memory or a random access memory or both. A computer can also include, or be operatively coupled to receive data from, or transfer data to, or both, one or more mass storage devices for storing data, e.g., optical disks, magnetic, or magneto optical disks. It should be noted that a computer does not require these devices. Furthermore, a computer can be embedded in another device. Non-limiting examples of the latter include a game console, a mobile telephone a mobile audio player, a personal digital assistant (PDA), a video player, a Global Positioning System (GPS) receiver, or a portable storage device. A non-limiting example of a storage device include a universal serial bus (USB) flash drive.

Computer readable media suitable for storing computer program instructions and data include all forms of non-volatile memory, media and memory devices; non-limiting examples include magneto optical disks; semiconductor memory devices (e.g., EPROM, EEPROM, and flash memory devices); CD ROM disks; magnetic disks (e.g., internal hard disks or removable disks); and DVD-ROM disks. The processor and the memory can be supplemented by, or incorporated in, special purpose logic circuitry.

To provide for interaction with a user, embodiments of the subject matter described herein can be implemented on a computer having a display device for displaying information to the user and input devices by which the user can provide input to the computer (for example, a keyboard, a pointing device such as a mouse or a trackball, etc.). Other kinds of devices can be used to provide for interaction with a user. Feedback provided to the user can include sensory feedback (e.g., visual feedback, auditory feedback, or tactile feedback). Input from the user can be received in any form, including acoustic, speech, or tactile input. Furthermore, there can be interaction between a user and a computer by way of exchange of documents between the computer and a device used by the user. As an example, a computer can send web pages to a web browser on a user's client device in response to requests received from the web browser.

Embodiments of the subject matter described in this specification can be implemented in a computing system that includes: a front end component (e.g., a client computer having a graphical user interface or a Web browser through which a user can interact with an implementation of the subject matter described herein); or a middleware component (e.g., an application server); or a back end component (e.g. a data server); or any combination of one or more such back end, middleware, or front end components. The components of the system can be interconnected by any form or medium of digital data communication, e.g., a communication network. Non-limiting examples of communication networks include a local area network ("LAN") and a wide area network ("WAN").

The computing system can include clients and servers. A client and server are generally remote from each other and typically interact through a communication network. The relationship of client and server arises by virtue of computer programs running on the respective computers and having a client-server relationship to each other.

FIG. 1 illustrates an example of a system 100 for partitioning data in a versioned database in accordance with one embodiment.

System 100 includes a database server 104, a database 102, and client devices 112 and 114. Database server 104 can include a memory 108, a disk 110, and one or more processors 106. In some embodiments, memory 108 can be volatile memory, compared with disk 110 which can be non-volatile memory. In some embodiments, database server 104 can communicate with database 102 using interface 116. Database 102 can be a versioned database or a database that does not support versioning. While database 102 is illustrated as separate from database server 104, database 102 can also be integrated into database server 104, either as a separate component within database server 104, or as part of at least one of memory 108 and disk 110. A versioned database can refer to a database which provides numerous complete delta-based copies of an entire database. Each complete database copy represents a version. Versioned databases can be used for numerous purposes, including simulation and collaborative decision-making.

System 100 can also include additional features and/or functionality. For example, system 100 can also include additional storage (removable and/or non-removable) including, but not limited to, magnetic or optical disks or tape. Such additional storage is illustrated in FIG. 1 by memory 108 and disk 110. Storage media can include volatile and nonvolatile, removable and non-removable media implemented in any method or technology for storage of information such as computer-readable instructions, data structures, program modules or other data. Memory 108 and disk 110 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 100. Any such non-transitory computer-readable storage media can be part of system 100.

System 100 can also include interfaces 116, 118 and 120. Interfaces 116, 118 and 120 can allow components of system 100 to communicate with each other and with other devices. For example, database server 104 can communicate with database 102 using interface 116. Database server 104 can also communicate with client devices 112 and 114 via interfaces 120 and 118, respectively. Client devices 112 and 114 can be different types of client devices; for example, client device 112 can be a desktop or laptop, whereas client device 114 can be a mobile device such as a smartphone or tablet with a smaller display. Non-limiting example interfaces 116, 118 and 120 can include wired communication links such as a wired network or direct-wired connection, and wireless communication links such as cellular, radio frequency (RF), infrared and/or other wireless communication links. Interfaces 116, 118 and 120 can allow database server 104 to communicate with client devices 112 and 114 over various network types. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). The various network types to which interfaces 116, 118 and 120 can connect can run a plurality of network protocols including, but not limited to Transmission Control Protocol (TCP), Internet Protocol (IP), real-time transport protocol (RTP), realtime transport control protocol (RTCP), file transfer protocol (FTP), and hypertext transfer protocol (HTTP).

Using interface 116, database server 104 can retrieve data from database 102. The retrieved data can be saved in disk 110 or memory 108. In some cases, database server 104 can also comprise a web server, and can format resources into a format suitable to be displayed on a web browser. Database server 104 can then send requested data to client devices 112 and 114 via interfaces 120 and 118, respectively, to be displayed on applications 122 and 124. Applications 122 and 124 can be a web browser or other application running on client devices 112 and 114.

Table 1 lists terms and descriptions:

TABLE 1

| TERMS AND DESCRIPTIONS | |
|---|---|
| Term | Description |
| SVL | Scenario Version List: List of versions that a scenario has access to. |
| VSL | Version Scenario List: List of scenarios that have access to a specific version. |
| VVDS | Version Visibility Data Structure: Data structure mapping a version to its respective VSL. The key to the data structure can typically be the version and value can be the VSL. |

In addition, the relationship scenarios and versions can be defined as a scenario structure. Non-limiting examples of a scenario structure are illustrated in Table 2, Table 4, Table 6, Table 8 and Table 10.

Figure 2:
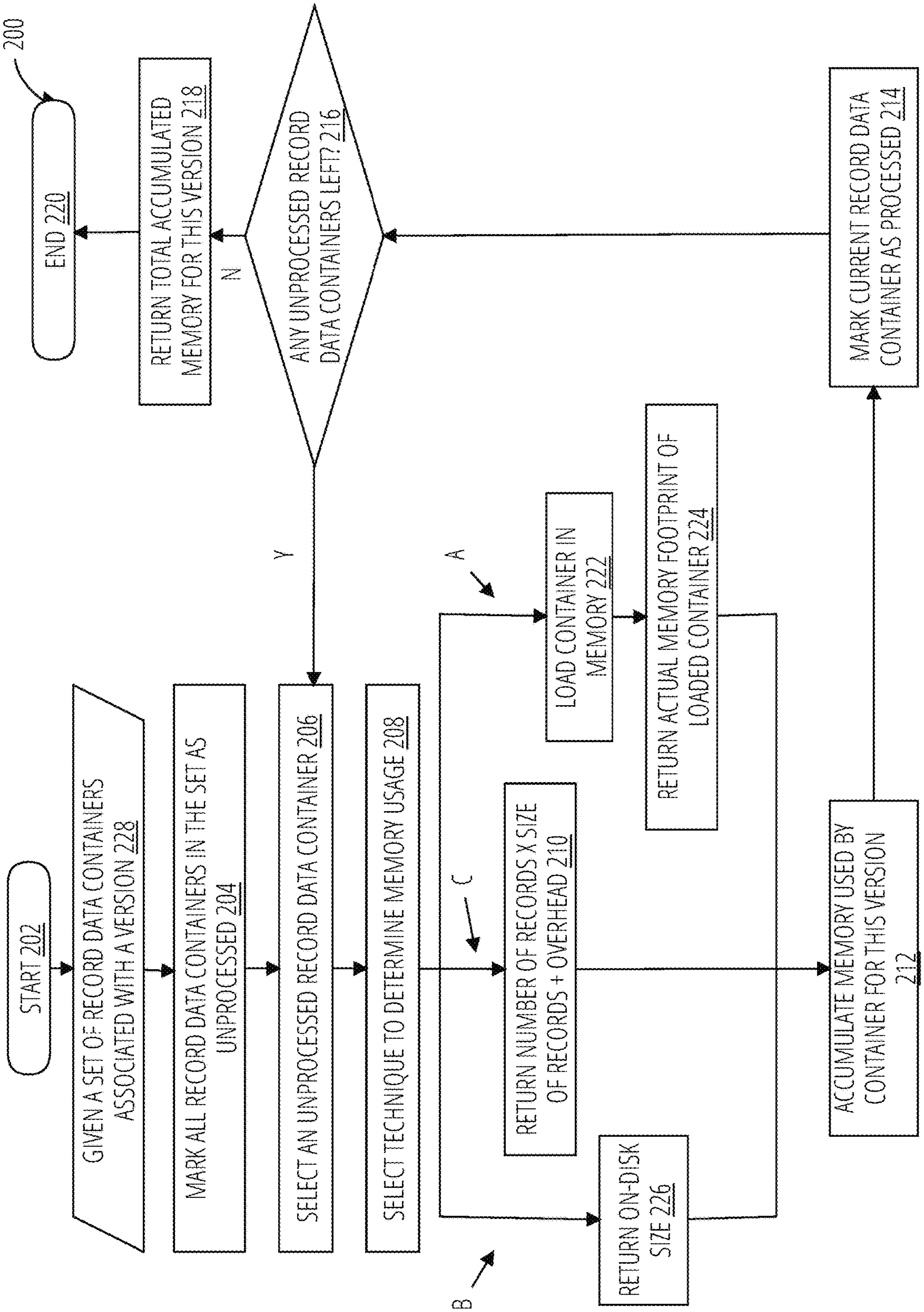
FIG. 2 illustrates a block diagram in accordance with one embodiment.

FIG. 2 illustrates a block diagram 200 for calculation of memory used by a single version, in accordance with one embodiment.

The process begins at 202. For a given set of record data containers associated with the single version (228), all entries in the set can be marked as unprocessed at block 204, after which an unprocessed record data container can be selected at block 206. A record data container simply means any way to represent data associated with the single version. In general, a record data container may comprise any data that is associated with the version in any format; the format can be any file format on disk, for example. Non-limiting examples include text, a Comma Separated Values (CSV) file, a spreadsheet, a proprietary data format, and so forth. The record data container can also be in memory, so that it does not have to be on disk. The record data container may take any representation as long as it is associated with the version. Note that the record container may include one record or more than one record. In some embodiments, a record container includes a plurality of records.

After selecting an unprocessed record data container at block 206, different techniques can be used to determine memory usage of the selected record data container, at block 208. While three techniques are shown in the embodiment in FIG. 2, it is understood that more than three different techniques may be available. In addition, the three techniques shown are not exclusive; other techniques for determining memory usage can be used.

In the embodiment shown in FIG. 2, there are tradeoffs between the different techniques. For example, the technique 'A' comprising the two steps 222 and 224 provides the highest in-memory accuracy of the memory usage. In this technique, first the selected container is loaded in memory at block 222, followed by returning an actual memory footprint of the loaded container at block 224. That is, the object can be loaded up in memory, and then its in-memory usage is measured.

On the other hand, technique 'B' at block 226, comprises returning the on-disk size of the container. That is, by determining the amount of on-disk size, one can determine how much on-disk storage is freed if the container is deleted. This is in contrast to technique 'A', in which the amount in-memory space is freed up if the container is deleted.

Technique 'C' at block 210, on the other hand, can provide an approximation of the in-memory size, which is less accurate than technique 'A'. Technique 'C' comprises returning the number of records in the container, multiplied by the size of each record, plus overhead. While this technique is an approximation for determining in-memory usage, it is relatively easy and quick to compute.

Once a technique to calculate memory usage of the selected record data container is selected and executed, memory used by the container for the version may be accumulated at block 212. The current record data container is then marked as processed at block 214. If there are further unprocessed record data containers left ('yes' at decision block 216), blocks 206-214 are repeated until there are no more unprocessed record data containers left (('no' at decision block 216). At this point, the total accumulated memory for the version may be returned at block 218, after which the subroutine ends at 220.

Figure 3:
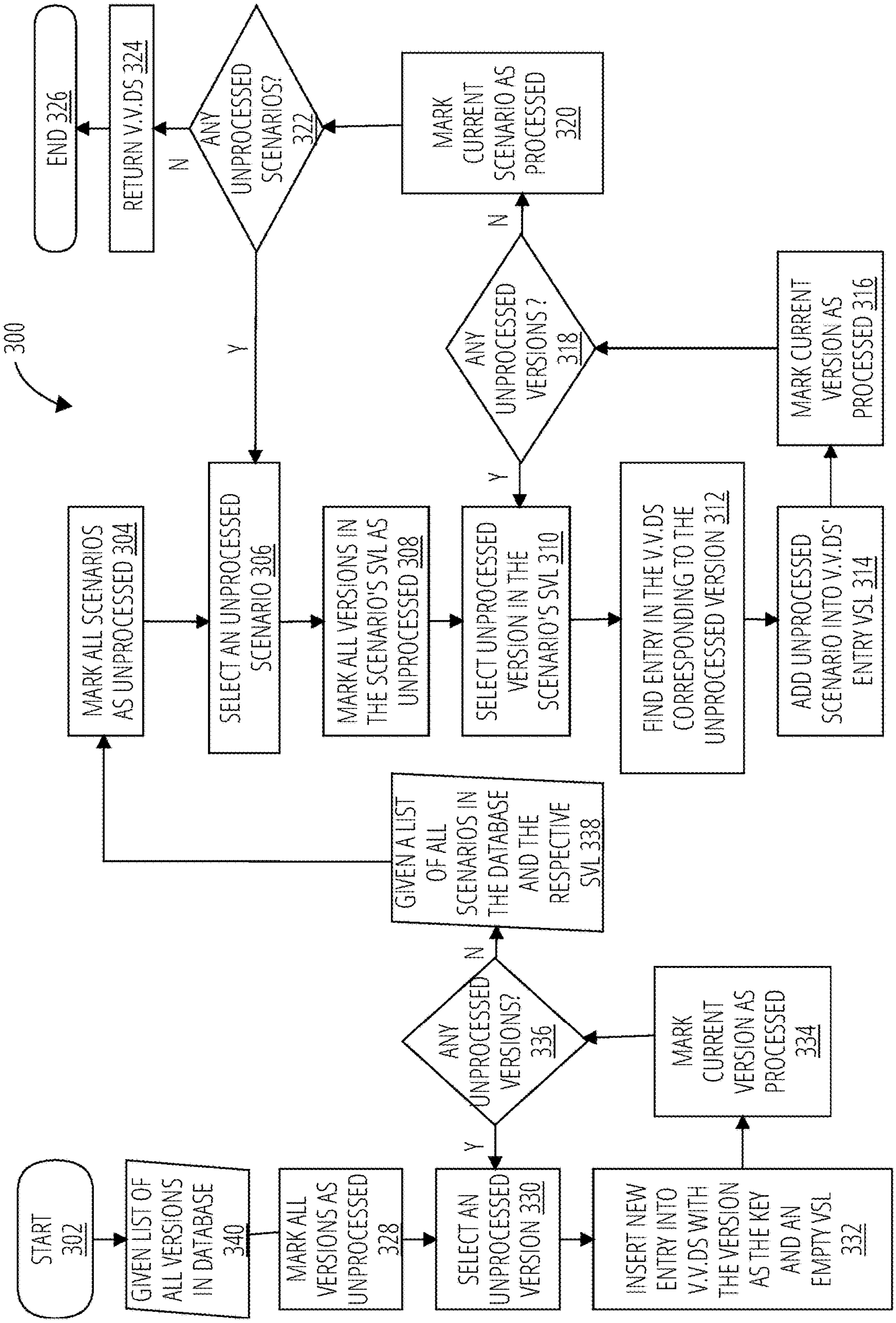
FIG. 3 illustrates a block diagram in accordance with one embodiment.

FIG. 3 illustrates a block diagram 300 for generation of a version visibility data structure (VVDS) in accordance with one embodiment. The process begins at 302. For a given list of all versions in a database (340), all versions can be marked as unprocessed at block 328, after which an unprocessed version can be selected at block 330.

The VVDS begins as an empty structure; the number of entries in the final form of the VVDS is the number of versions. At block 332, a new entry (with the selected version as the key) is inserted into the VVDS, along with and empty VSL. Recall from Table 1, that VSL is the Version Scenario List (a list of scenarios that have access to a specific version). This is continued through block 334 and decision block 336 until there are no more versions to process ('N' at decision block 336). At this stage, the VVDS has been initialized, and includes an empty VSL associated with each entry.

The remainder of the block diagram 300 comprises steps to process scenarios. Given a list of all scenarios in the database and the respective SVL (at 338), all scenarios are marked as unprocessed at block 304. Recall from Table 1, that SVL is the Scenario Version List (a list of versions that a scenario has access to). Once an unprocessed scenario is selected at block 306, all of the versions in the selected scenario's SVL are marked as unprocessed at block 308. An unprocessed version with the scenario's SVL is then selected at block 310. Next, at block 312, the entry in the VVDS that corresponds to the selected unprocessed version, is located. The selected unprocessed scenario is then added into the VSL entry of the VVDS at block 314. The selected unprocessed version in the scenario's SVL is then marked as processed at block 316.

The remaining unprocessed versions in the selection scenario's SVL are processed ('Y" at decision block 318) according to block 312, block 314 and block 316 until there are no more unprocessed versions in the scenario's SVL ('N" at decision block 318). The selected scenario is then marked as processed at block 320. The remaining unprocessed scenarios are then processed ('Y" at decision block 322) according to block 306, block 308, block 310, block 312, block 314, block 316, decision block 318 and block 320, until all scenarios have been processed ('N' at decision block 322), resulting in the VVDS which is returned at block 324. The VVDS generation process ends at 326.

Figure 4:
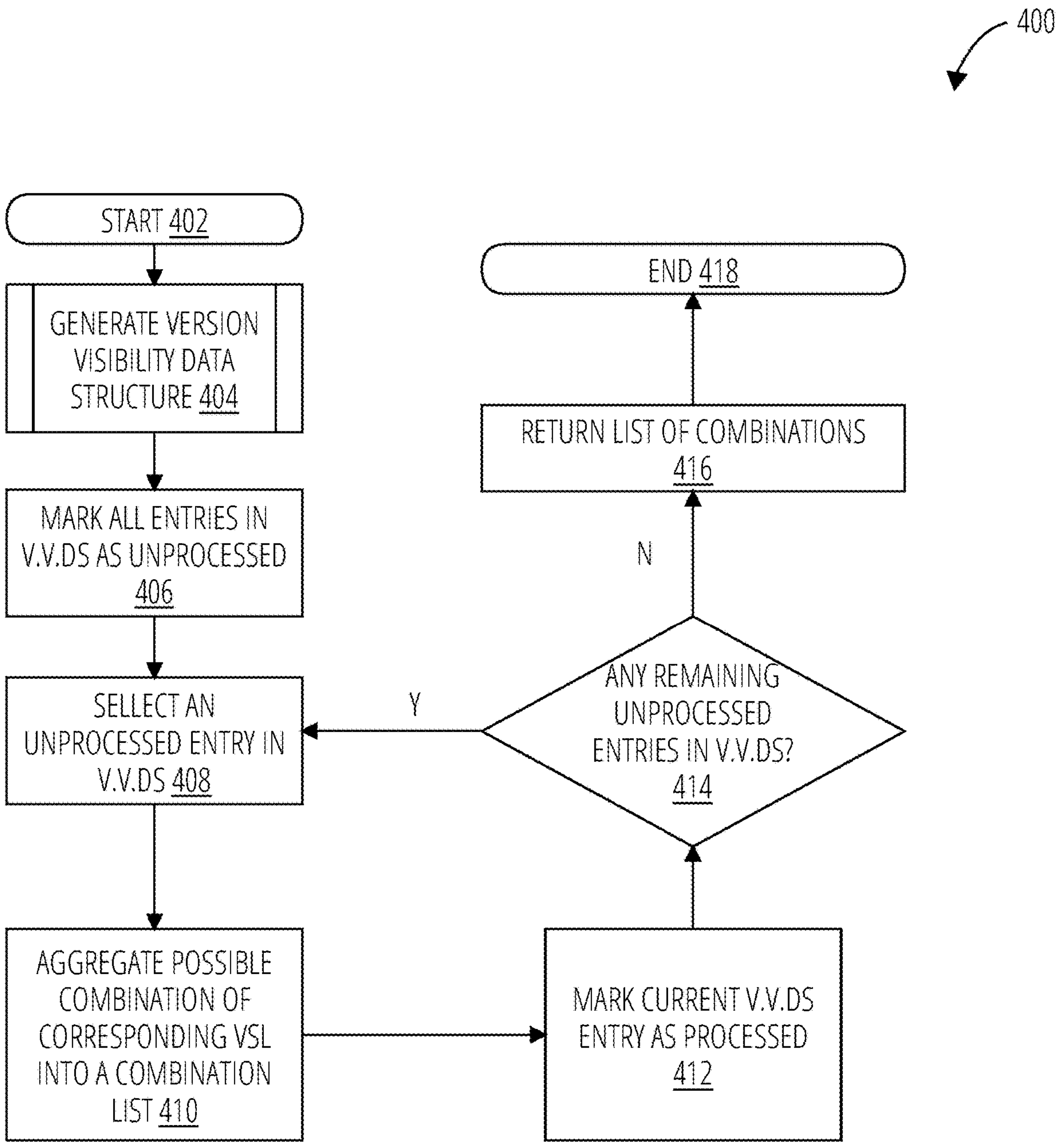
FIG. 4 illustrates a block diagram in accordance with one embodiment.
Figure 5:
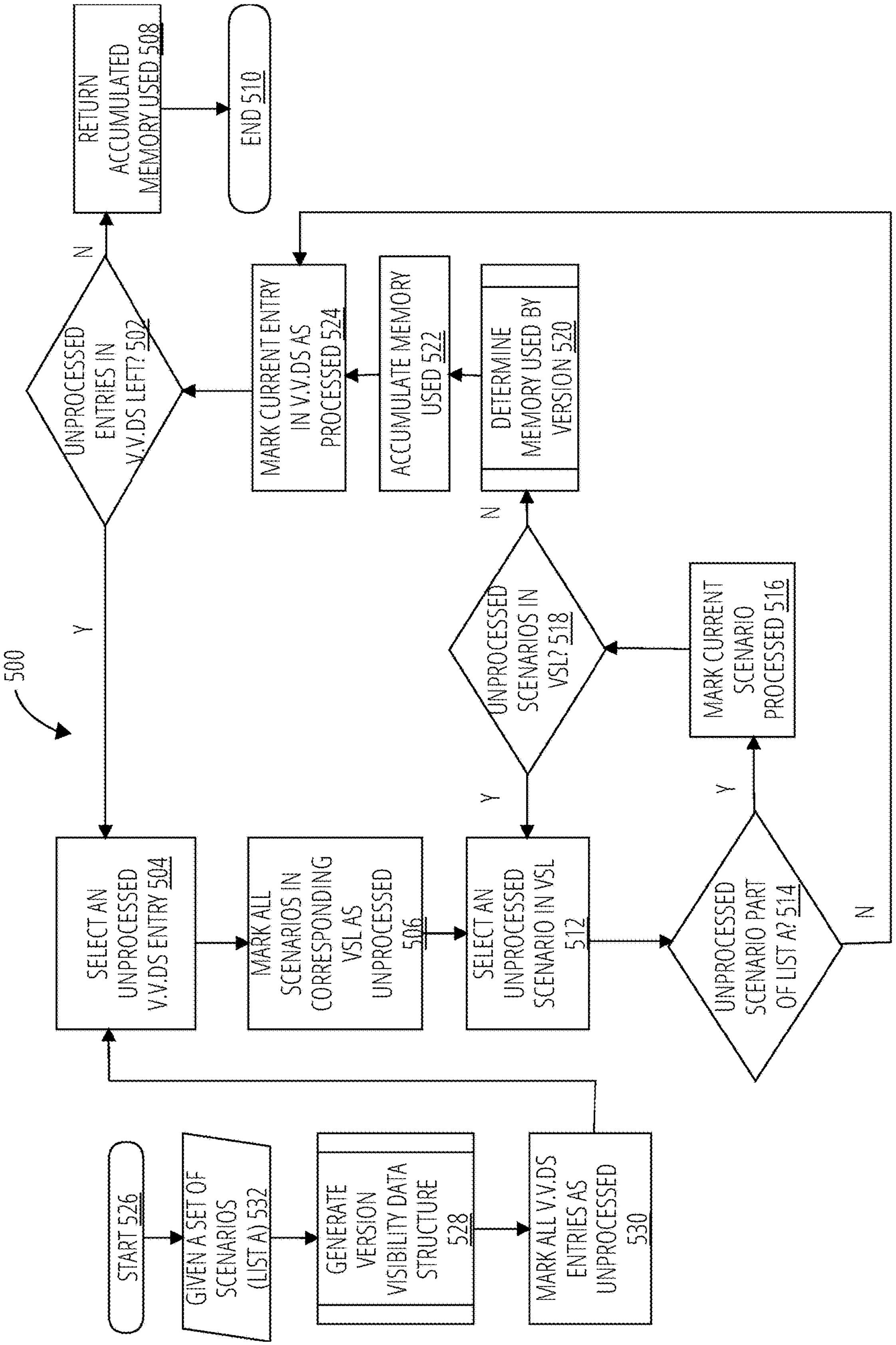
FIG. 5 illustrates a block diagram in accordance with one embodiment.

Generation of a VVDS can be used in a process for gathering all combinations of scenarios deletions that can reclaim memory (see an embodiment thereof in FIG. 4), and can be used in a process for computing an amount of memory reclaimed by deleting a set of scenarios (see an embodiment thereof in FIG. 5).

FIG. 4 illustrates a block diagram 400 for gathering all combinations of scenarios deletions that can reclaim memory, in accordance with one embodiment. The process begins at 402. A VVDS is generated at 404; generation of the VVDS can be carried out, in an embodiment, according to the block diagram 300 in FIG. 3. At block 406, each entry in the VVDS is marked as unprocessed. One unprocessed entry is then selected at block 408. The selected unprocessed entry contains a version and its respective VSL. The VSL corresponding to the unprocessed entry is a possible combination (of scenarios deletion that can reclaim memory). At block 410, aggregated the possible combination into a combination list, after which the selected entry in the VVDS is marked as processed at block 412. Each remaining entry in the VVDS is processed ('Y' at decision block 414) according to block 406, block 408 and block 410, until there are no more entries remaining in the VVDS to process ('N' at decision block 414), at which point, a list of combinations is returned at block 416. The process ends at 418.

Figure 6:
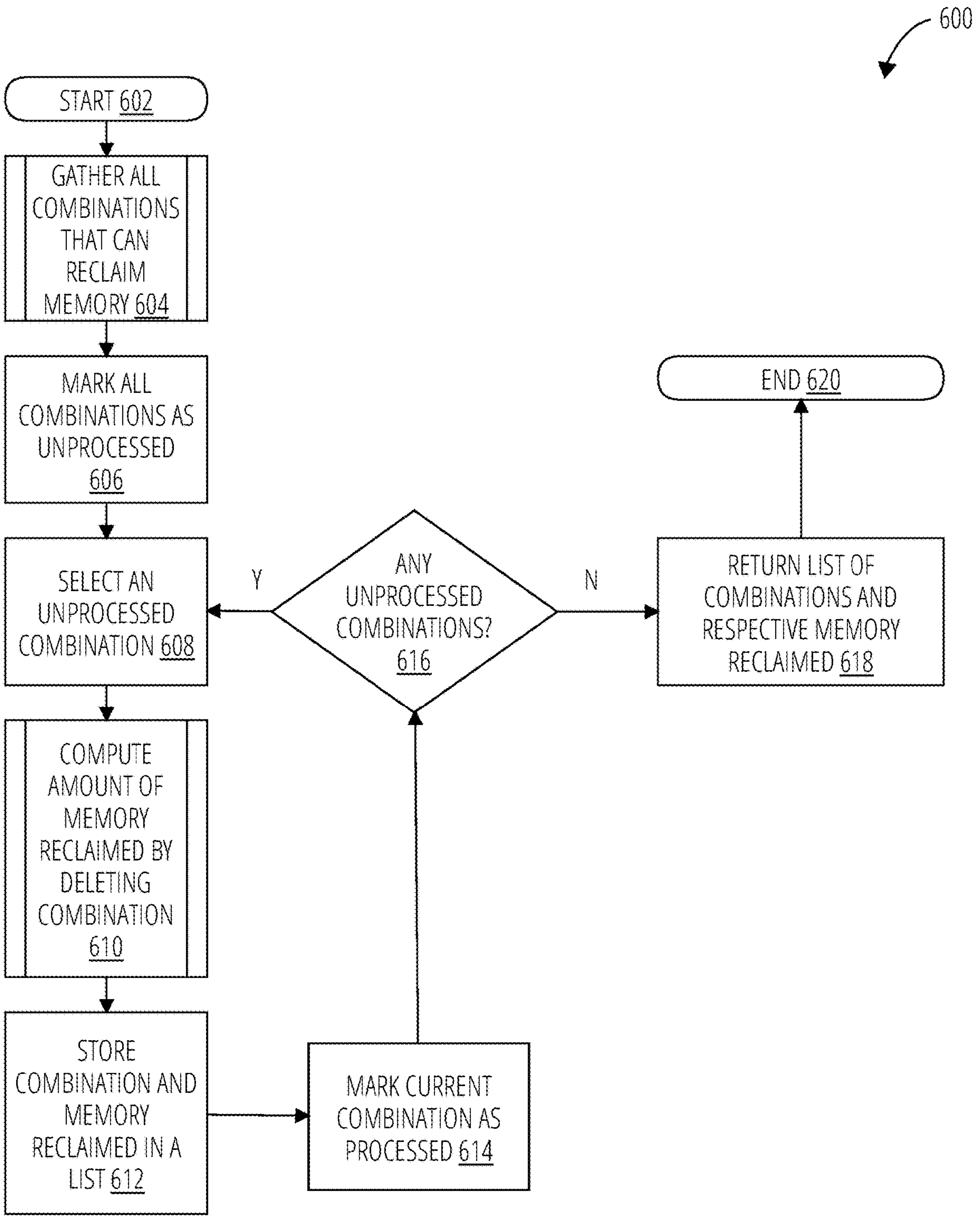
FIG. 6 illustrates a block diagram in accordance with one embodiment.

Gathering all combinations of scenarios deletions that can reclaim memory (an embodiment thereof which is shown in FIG. 4), can be used in a process for creating a list of best combinations of scenario deletions and the amount of memory the deletions free up (see an embodiment thereof in FIG. 6).

Given a set of scenarios, FIG. 5 illustrates a block diagram for computing the amount of memory reclaimed by deleting the set, in accordance with one embodiment.

The process begins at 526. Given a set of scenarios (the list can be labeled as list 'A') at 532, generate a VVDS at subroutine block 528. An example of VVDS generation is illustrated in FIG. 3. Next, at block 530, all entries in the VVDS are marked as unprocessed. One unprocessed entry of the VVDS is then selected at block 504. For the selected VVDS entry, all the scenarios in the corresponding VSL are marked as unprocessed at block 506. The scenarios within the corresponding VSL are then processed by selecting an unprocessed scenario within the VSL, and then checking to see if the selected unprocessed scenario is part of list 'A' at decision block 514.

If the answer is 'yes' at decision block 514, the current scenario in the VSL is marked as processed at block 516. If there are further scenarios to process in the VSL ('Y' at decision block 518), then the processing repeats beginning at block 512.

If there are no further scenarios to process in the VSL ('N' at decision block 518), then the version corresponding to the unprocessed VVDS entry will be freed up by deleting all of the scenarios in list 'A'. The memory used by the version can then be calculated according to subroutine block 520. An embodiment of subroutine block 520 is illustrated in FIG. 2. The amount of memory used is then accumulated at block 522, and the current entry in the VVDS is marked as processed at block 524. If there are further unprocessed entries in the VVDS ('Y" at decision block 502), then the remaining unprocessed VVDS entries are processed according to block 504, block 506, block 512, decision block 514, block 516, decision block 518, subroutine block 520, and block 522. Once all of the VVDS entries are processed ('N" at decision block 502), the accumulated memory that is used, is returned at block 508. The process ends at 510.

If the answer is 'no' at decision block 514, the version corresponding to the unprocessed VVDS entry will not be freed up by deleting all of the scenarios in list 'A'. The current entry in the VVDS is thus marked as processed at block 524. If there are further unprocessed entries in the VVDS ('Y" at decision block 502), then the remaining unprocessed VVDS entries are processed according to block 504, block 506, block 512, decision block 514, block 516, decision block 518, subroutine block 520, and block 522. Once all of the VVDS entries are processed ('N" at decision block 502), the accumulated memory that is used, is returned at block 508. The process ends at 510.

Computing the amount of memory reclaimed by deleting a given set of scenarios (an embodiment thereof which is shown in FIG. 5), can be used in a process for creating a list of best combinations of scenario deletions and the amount of memory the deletions free up (see an embodiment thereof in FIG. 6).

FIG. 6 illustrates a block diagram 600 for creating a list of best combinations of scenario deletions and the amount of memory the deletions free up, in accordance with one embodiment. That is, FIG. 6 provides all scenario sets that can be deleted to free up any memory.

The process begins at 602. All combinations that can reclaim memory, are gathered by subroutine block 604 (an embodiment of which is shown in FIG. 4). The combinations are then processed, beginning at block 606, where all of the combinations are marked as unprocessed. An unprocessed combination is then selected at block 608 for processing.

For the selected combination of scenarios, the amount of memory reclaimed by deleting the combination, can be computed by subroutine 610 (an embodiment of which is shown in FIG. 5). The combination and the associated memory reclaimed, are stored in a list at block 612. The selected combination is then marked as processed at block 614. All remaining unprocessed combinations ('Y' at decision block 616) are processed beginning at 608, until all combinations are processed ('N' at decision block 616). The complete list of scenario combinations and the respective memory reclaimed are returned at block 618. The process ends at 620.

Figure 7:
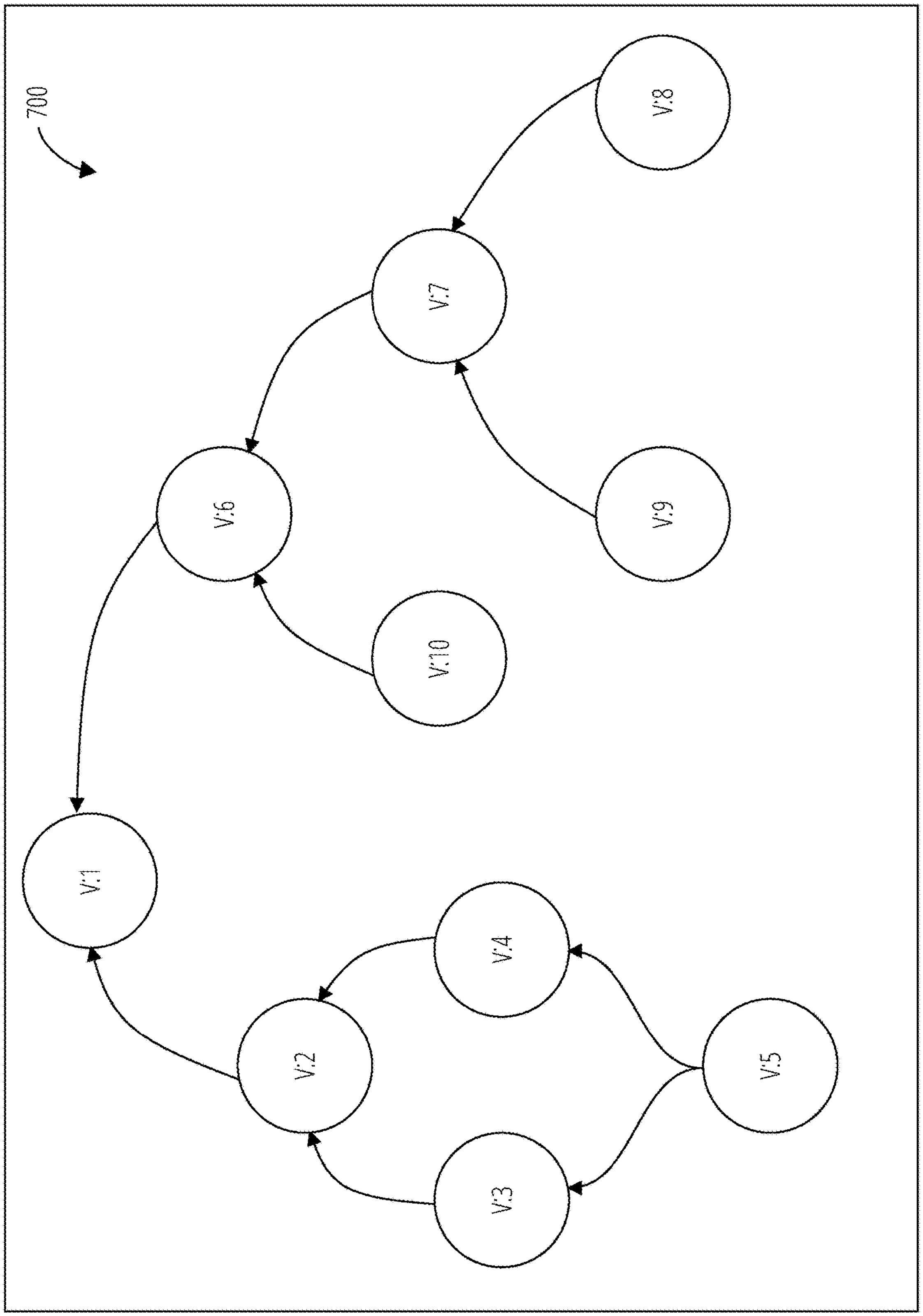
FIG. 7 illustrates a version graph in accordance with one embodiment.

FIG. 7 illustrates relationships between versions and their respective parent versions in accordance with one embodiment. These relationships are also defined as a version graph 700. The topmost version is the root version. Except for the root version (in this case, V:1), a version is derived from parent versions, and contains a delta of data that has changed between itself and its parent. Everything may be derived from the root version; thus all versions can 'see' the root version.

Scenarios are associated with a version. A user can typically run one or more queries on a scenario. The scenario and its respective SVL, which can be derived from the head version and version graph, may dictate the data available to the scenario and query. Note that different scenarios with different SVLs can have different representations of the same record.

TABLE 2 lists the relationship between scenarios and versions in the version graph 700. The relationship between scenarios and versions is an example of a scenario structure.

TABLE 2

Relationship Between Scenarios and Versions

| Scenario | Head Version | SVL |
|---|---|---|
| Scenario A | 1 | 1 |
| Scenario B | 3 | 3:2:1 |
| Scenario C | 5 | 5:4:3:2:1 |
| Scenario D | 10 | 10:6:1 |
| Scenario E | 9 | 9:7:6:1 |
| Scenario F | 8 | 8:7:6:1 |
| Scenario G | 8 | 8:7:6:1 |

A version contains some delta information that makes it different from its parent. Thus, versions get created as data changes across the database. On the other hand, a scenario is a pointer to a version. That is, scenarios and versions are independent from each other. Thus, in Table 2, there is no scenario in which V2, V4, V6, or V7 serve as a head version. Furthermore, this implies that a user cannot run a query that looks at data from the perspective of V2, or that of V4, or that of V6, or that of V7. With respect to V2, a user can run a query on Scenario B which will run from the of perspective V3, (V3 can see V2 and V1). To summarize, in the example shown in Table 2, there is no pointer (that is, scenario) to V2, nor is there a pointer to V4, nor a pointer to V6, nor a pointer to V7.

Figure 8:
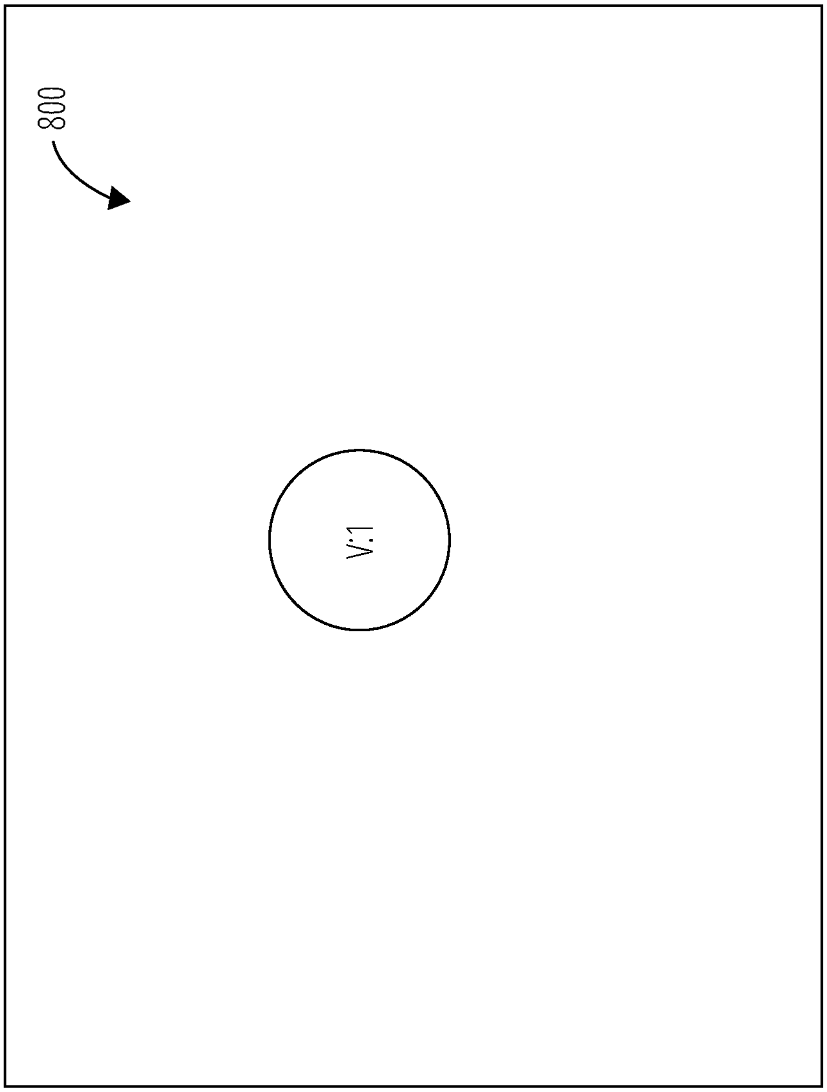
FIG. 8 illustrates a version graph and accompanying tables in accordance with one embodiment.

FIG. 8 illustrates a version graph 800 in accordance with one embodiment, with accompanying Table 3 and Table 4 as shown below. Table 3 lists the amount of memory used by versions, while Table 4 lists the relationship between scenarios and versions. The relationship between scenarios and versions is an example of a scenario structure.

TABLE 3

Amount of Memory Used by Versions

| Version Number | Memory Used |
|---|---|
| 1 | 1 MB |

TABLE 4

Relationship Between Scenarios and Versions.

| Scenario | Head Version | SVL |
|---|---|---|
| Scenario A | 1 | 1 |
| Scenario B | 1 | 1 |

In FIG. 8, deleting Scenario A will have no net effect on the version graph. Therefore, deleting Scenario A frees up 0 MB. Similarly, deleting Scenario B will have no net effect on the version graph. Therefore, deleting Scenario B frees up 0 MB. However, deleting Scenario A and Scenario B causes version 1 to be orphaned and reclaimable. Therefore, deleting Scenario A and Scenario B frees up 1 MB.

Figure 9:
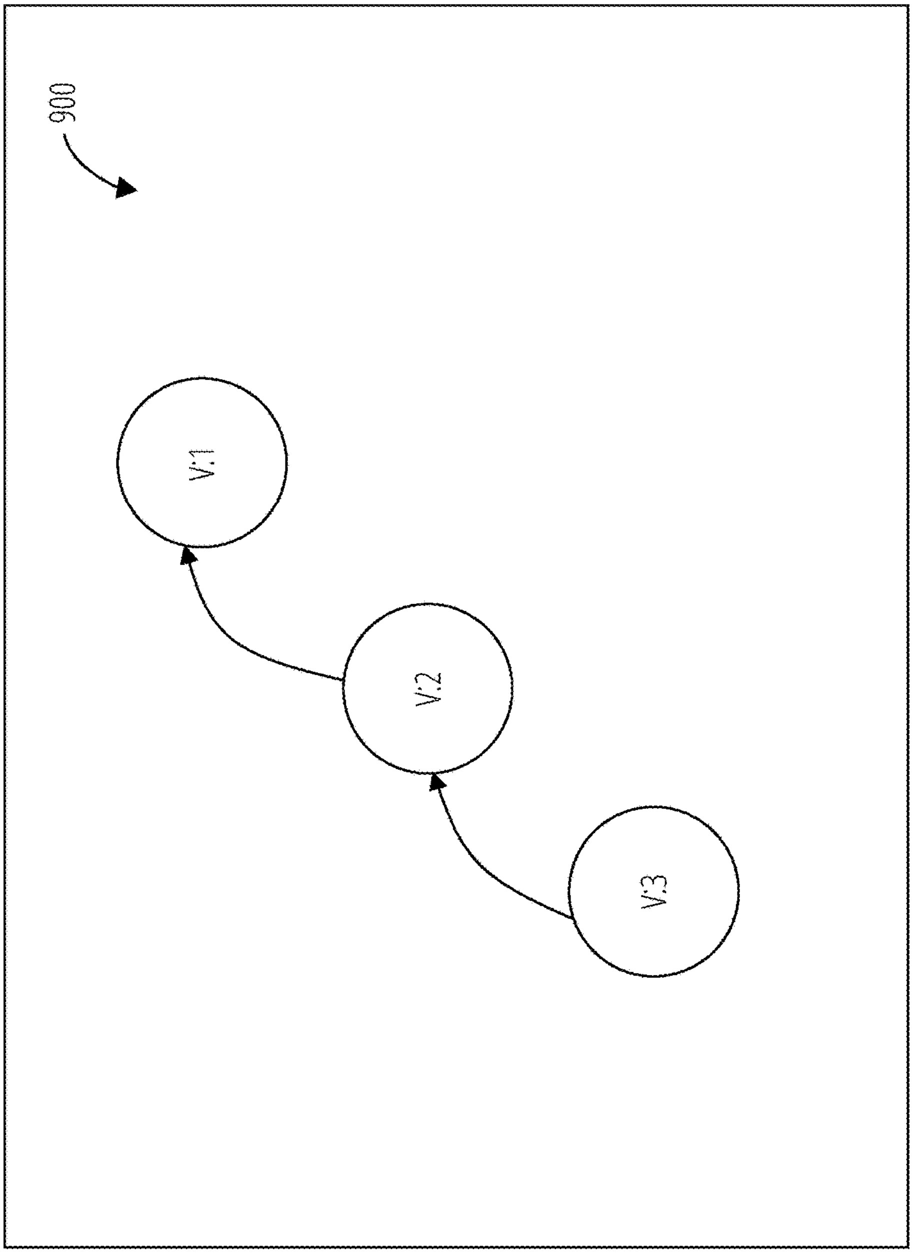
FIG. 9 illustrates a version graph in accordance with one embodiment.

FIG. 9 illustrates a version graph 900 in accordance with one embodiment, with accompanying Table 5 and Table 6 shown below. Table 5 lists the amount of memory used by versions, while Table 6 lists the relationship between scenarios and versions. The relationship between scenarios and versions is an example of a scenario structure.

TABLE 5

Amount of Memory Used by Versions

| Version Number | Memory Used |
|---|---|
| 1 | 1 MB |
| 2 | 2 MB |
| 3 | 3 MB |

TABLE 6

Relationship Between Scenarios and Versions.

| Scenario | Head Version | SVL |
|---|---|---|
| Scenario A | 1 | 1 |
| Scenario B | 3 | 3:2:1 |

In FIG. 9, deleting Scenario A will have no net effect on the version graph. Therefore, deleting Scenario A frees up 0 MB. However, deleting Scenario B will cause version 2 and version 3 to be orphaned and reclaimable. Therefore, deleting Scenario B frees up a total of 5 MB. Finally, deleting Scenario A and Scenario B causes version 1, version 2 and version 3 to be orphaned and reclaimable. Therefore, deleting Scenario A and Scenario B frees up a total of 6 MB.

Figure 10:
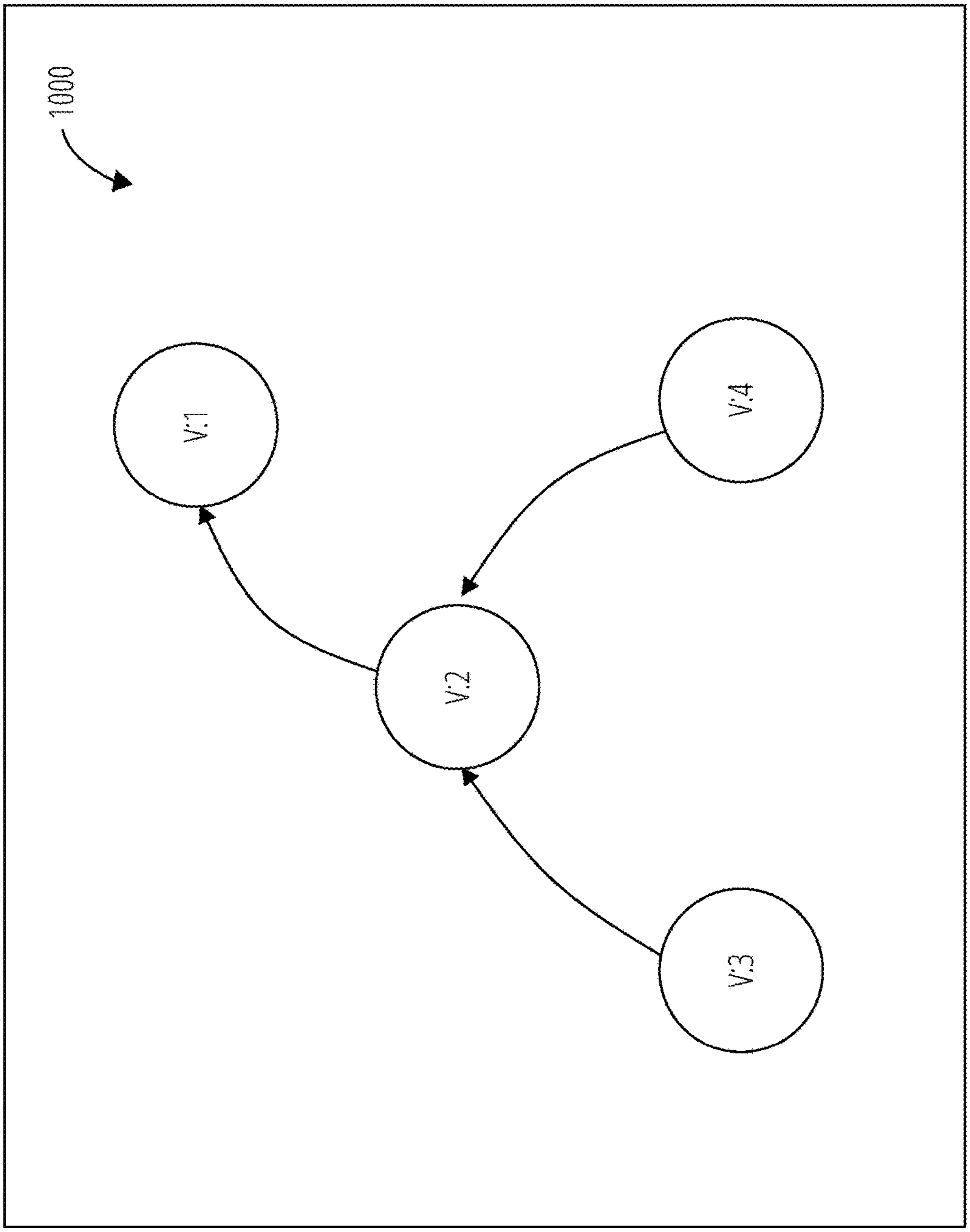
FIG. 10 illustrates a version graph in accordance with one embodiment.

FIG. 10 illustrates a version graph 1000 in accordance with one embodiment, with accompanying Table 7 and Table 8 shown below. Table 7 lists the amount of memory used by versions, while Table 8 lists the relationship between scenarios and versions. The relationship between scenarios and versions is an example of a scenario structure.

TABLE 7

Amount of Memory Used by Versions

| Version Number | Memory Used |
|---|---|
| 1 | 5 MB |
| 2 | 3 MB |
| 3 | 2 MB |
| 4 | 7 MB |

TABLE 8

Relationship Between Scenarios and Versions.

| Scenario | Head Version | SVL |
|---|---|---|
| Scenario A | 1 | 1 |
| Scenario B | 3 | 3:2:1 |
| Scenario C | 4 | 4:2:1 |

In FIG. 10, deleting Scenario A will have no net effect on the version graph. Therefore, deleting Scenario A frees up 0 MB. However, deleting Scenario B will cause version 3 to be orphaned and reclaimable. Therefore, deleting Scenario B frees up a total of 2 MB. Next, deleting Scenario C causes version 4 to be orphaned and reclaimable. Therefore, deleting Scenario C frees up a total of 7 MB.

As for deleting two scenarios, the situation is as follows in FIG. 10. Deleting Scenario A and Scenario B causes version 3 to be orphaned and reclaimable. Therefore, deleting Scenario A and Scenario B frees up a total of 2 MB. Next, deleting Scenario A and Scenario C causes version 4 to be orphaned and reclaimable. Therefore, deleting Scenario A and Scenario C frees up a total of 7 MB. Finally, deleting Scenario B and Scenario C causes version 2, version 3 and version 4 to be orphaned and reclaimable. Therefore, deleting Scenario B and Scenario C frees up a total of 12 MB. Finally, deleting all three scenarios causes all the data (12 MB) to be freed up.

Figure 11:
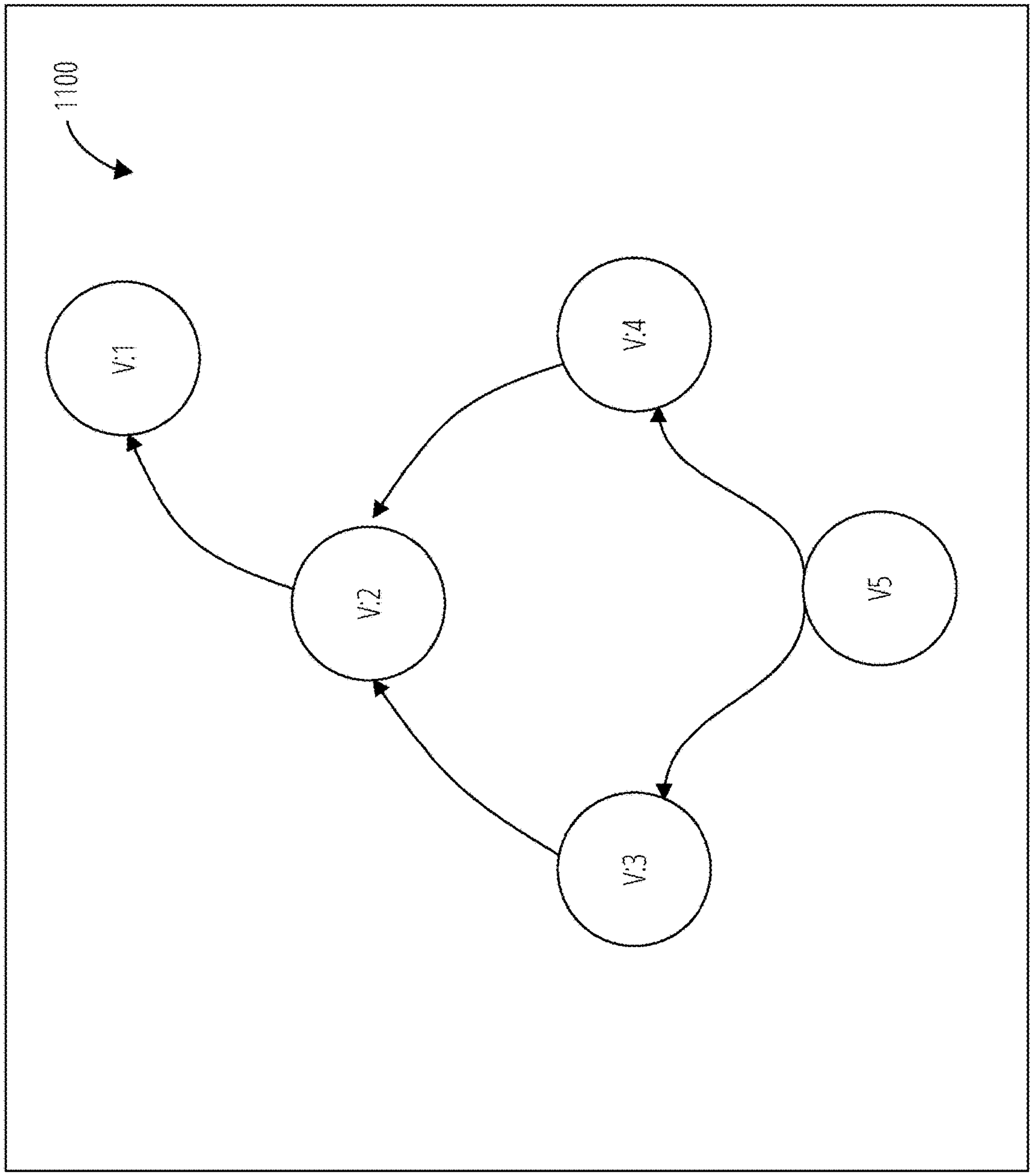

FIG. 11 illustrates a version graph 1100 in accordance with one embodiment, with accompanying Table 9 and Table 10 shown below. Table 9 lists the amount of memory used by versions, while Table 10 lists the relationship between scenarios and versions. The relationship between scenarios and versions is an example of a scenario structure.

TABLE 9

Amount of Memory Used by Versions

| Version Number | Memory Used |
|---|---|
| 1 | 3 MB |
| 2 | 5 MB |
| 3 | 7 MB |

TABLE 9-continued

| Amount of Memory Used by Versions | |
|---|---|
| Version Number | Memory Used |
| 4 | 2 MB |
| 5 | 1 MB |

TABLE 10

| Relationship Between Scenarios and Versions. | | |
|---|---|---|
| Scenario | Head Version | SVL |
| Scenario A | 1 | 1 |
| Scenario B | 3 | 3:2:1 |
| Scenario C | 5 | 5:4:3:2:1 |

In FIG. 11, deleting Scenario A has no net effect on the version graph. Therefore, deleting Scenario A frees up 0 MB. Similarly, deleting Scenario B has no net effect on the version graph. Therefore, deleting Scenario B frees up 0 MB. However, deleting Scenario C causes version 4 and version 5 to be orphaned and reclaimable. Therefore, deleting Scenario C frees up a total of 3 MB.

As for deleting two scenarios, the situation is as follows in FIG. 11. Deleting Scenario A and Scenario B has no net effect on the version graph. Therefore, deleting Scenario A and Scenario B frees up 0 MB. Next, deleting Scenario A and Scenario C causes version 4 and version 5 to be orphaned and reclaimable. Therefore, deleting Scenario A and Scenario C frees up a total of 3 MB. Finally, deleting Scenario B and Scenario C causes version 2, version 3, version 4 and version 5 to be orphaned and reclaimable. Therefore, deleting Scenario B and Scenario C frees up a total of 15 MB. Finally, deleting all three scenarios causes all the data (18 MB) to be freed up.

Figure 12:
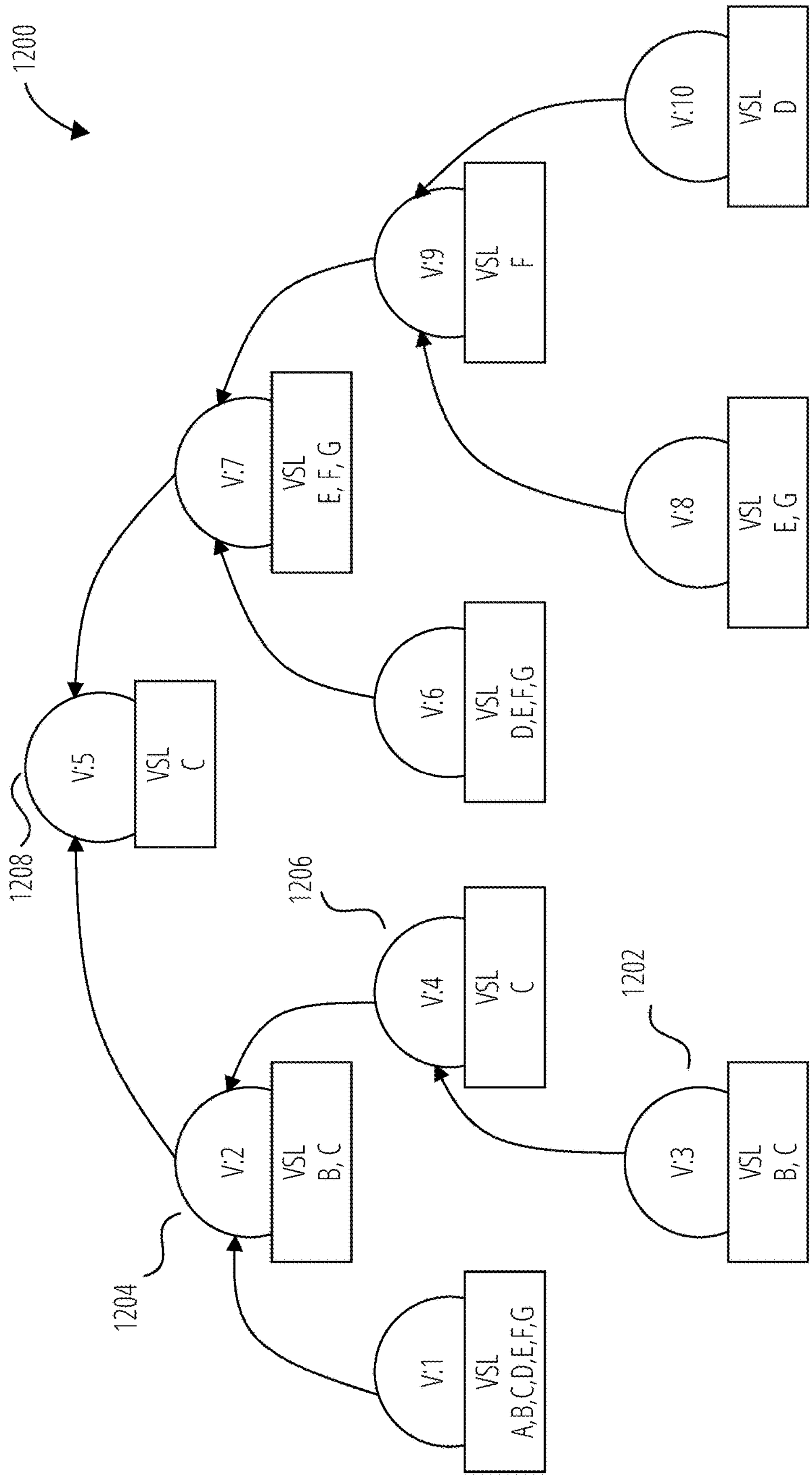

FIG. 12 illustrates a Version Visibility Data Structure 1200 generated from version graph 700 in FIG. 7. In FIG. 12, each node contains a combination of scenarios, that once deleted, guarantee freeing up some memory. At a minimum, deleting a particular combination of scenarios frees up the version associated with the VSL, and consequently, the memory associated with that version is freed up.

It should be noted that deleting all of the scenarios in a VSL can free up far more than the associated version. For example, deleting the scenarios within the VSL specified by version 3 (1202) (Scenario B and Scenario C) frees up not only version 3 (1202), but also version 2 (1204), version 4 (1206) and version 5 (1208).

Partitioning a Versioned Database

Figure 13:
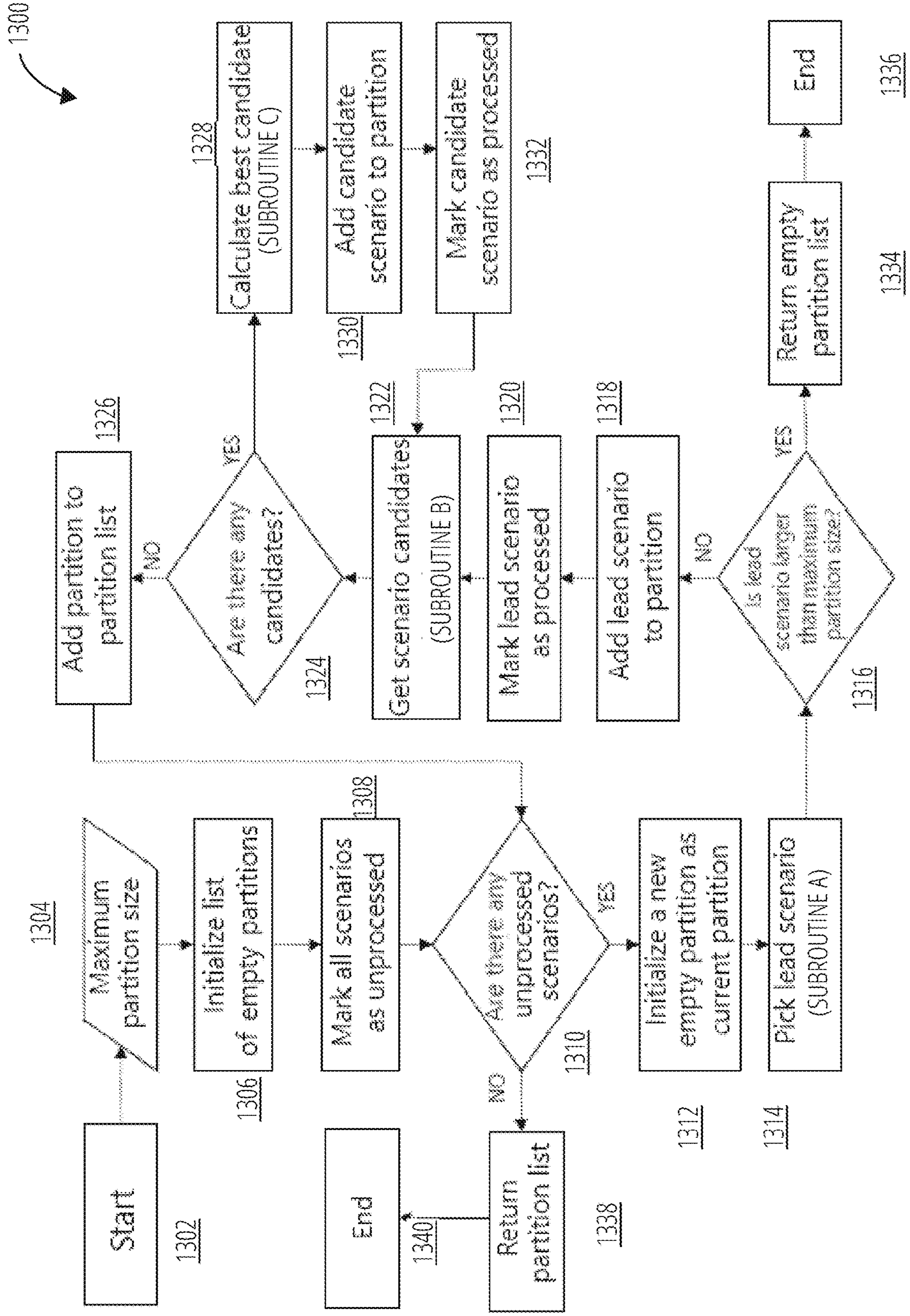
FIG. 13 illustrates a version graph in accordance with one embodiment.

FIG. 13 illustrates a block diagram 1300 for partitioning a versioned database in accordance with one embodiment.

The process begins at 1302. A maximum partition size is input at 1304. It should be noted that the maximum partition size should not exceed the size of the database. For example, if the size of the database is 1 terabyte, the partition size should not exceed that size.

At 1306, a list of empty partitions is initialized, each empty partition in the list will be populated by a set of scenarios. A partition is basically a set of scenarios; the block diagram 1300 provides a process of deciding which scenarios populate which partition. Therefore, all of the scenarios in the database will be processed.

The processing of scenarios begins at 1308, where all of the scenarios in the database are marked as unprocessed. The iterative processing of scenarios continues at decision block 1310. While a list of empty partitions was initialized at 1306, at 1312, a new empty partition is initialized (or created) as the current partition at 1312. This current partition may become populated with one or more scenarios, as discussed further.

A lead scenario is then chosen at 1314. The "lead" scenario refers to the first scenario that populates the current partition. The first scenario in the partition can play an important role in the effectiveness of the partition. The manner in which the lead scenario is chosen, is further described in Subroutine A below. Briefly, Subroutine A returns a first scenario to populate the empty partition.

If the lead scenario is larger than the maximum partition size ('yes' at decision block 1316), then an empty partition list is returned at 1334, and process ends at 1336. For example, if the maximum partition is 100 gigabytes, while the lead scenario is 200 gigabytes, then it is impossible to place the lead scenario into any partition (since it is impossible to split a scenario into smaller sub-scenarios). If there is even a single scenario with a size that exceeds the maximum partition size, then partitioning will not take place. This also implies that, for example, if the maximum partition size is selected as the size of a machine, and a scenario exceeds the maximum partition size, then a larger machine is needed in order to perform the partition.

On the other hand, if the lead scenario is less than or equal to the maximum partition size ('no' at decision block 1316), then the lead scenario is added to the partition at 1318. For example, if the current partition is 100 gigabytes, while the lead scenario is 50 gigabytes, then the lead scenario is placed into the partition The lead scenario is then marked as processed at 1320.

Next, the process obtains a list of scenario candidates at 1322 (this is further described in Subroutine B below). These are candidate scenarios that may be placed in the partition (which now contains the lead scenario).

If there are no candidates ('no' at decision block 1324), then the partition is added to a partition list at 1326, and the next scenario is processed at decision block 1310. For example, if the maximum partition size is 100 gigabytes, and the lead scenario has a size of 99 gigabytes, it may not be possible to find another scenario (of 1 gigabyte or less) that can fit into the partition.

On the other hand, if there are potential candidate scenarios ('yes' at decision block 1324), then the best candidate scenario (to place in the partition) is calculated at 1328. Such a calculation is further described in Subroutine C below. The best candidate scenario is then added to the partition at 1330, and the candidate scenario is marked as processed at 1332.

The process reverts once more to 1322, where a new list of scenario candidates is obtained using Subroutine B (described below). A new list is calculated, since the available size in the partition has changed—the previous list of scenario candidates may not be suitable for the new situation. The loop 1322-1324-1328-1330-1332-1322 is performed iteratively until all of the scenarios are processed ('no' at decision block 1310), at which point, the partition list is returned at 1338 and the process ends at 1340.

Subroutine a: Picking a Lead Scenario

The step 1314 of picking a lead scenario in FIG. 13, can be described as follows. Given a the list of unprocessed scenarios, Subroutine A is responsible for returning a single scenario. Block diagram 1300 can use this scenario as the initial scenario to populate an empty partition. There can exist multiple techniques to select the initial scenario, such as:

1. Random scenario: that is, any scenario from the scenarios in the database.
2. Most frequently used scenario, based on user data.
3. Newest/oldest scenario.
4. Scenario with the longest SVL.
5. Scenario with the most data. In some embodiments, the lead scenario is the scenario with the most data.
6. Scenario whose SVL overlaps with other scenario SVLs.

Subroutine B: Get Scenario Candidates

Given a list of unprocessed scenarios, current partition and maximum partition size, Subroutine B is responsible for returning a list of scenarios. This list of scenarios is a subset of unprocessed scenarios that may be appended to the partition. Block diagrams 1300 can use this list scenarios as candidates to append to the current partition.

There can exist multiple techniques to calculate viable candidates, such as:

1. Candidates may not exceed the maximum partition size if they were appended to the partition. In some embodiments, candidates may not exceed the maximum partition size when appended to partition.
2. Candidates scenarios are children of any of the partition's existing scenarios.

Subroutine C: Calculate Best Candidate to Add to Partition

Given a list of scenario candidates and the current partition, Subroutine C is responsible for returning a scenario. Block diagram 1300 can append this scenario to the current partition.

There can exist multiple techniques to calculate the best candidates, such as:

1. Random
2. Most frequently used scenario
3. Newest/oldest scenario
4. Scenario with the longest SVL
5. Scenario with the most data
6. A scenario that shares the most data with the current partition. For example, suppose there is a scenario of 100 gigabytes and another scenario of 100 gigabytes. If both scenarios are placed in the same partition, the total size can be anywhere between 100 gigabytes and 200 gigabytes, since there can be overlap between the two scenarios if they share the same data. If the two scenarios are completed disjoined, then the combined size will be 200 gigabytes, but if they share data, then the combined size will be between 100 gigabytes and 200 gigabytes. Since this is a versioned database, both scenarios more than likely have an overlap of data. Therefore, a scenario can be chosen such that this scenario shares the most data with a scenario already in the partition. This results in the partition having an extra scenario, without paying a memory cost.

Example of a Partitioning Scheme

In an example, an initial partitioning scheme is provided by splitting all the scenarios in FIG. 7 into multiple partitions to maximize version reuse while adhering to a maximum partition size. The details are as follows:

Database size: 10 MB.

Unique data per version: V1—1 MB, V2—1 MB, V3—1 MB, V4—1 MB, V5—1 MB, V6—1 MB, V7—1 MB, V8—1 MB, V9—1 MB, V10—1 MB.

Scenario sizes: Scenario A—1 MB, Scenario B—3 MB, Scenario C—5 MB, Scenario D—3 MB, Scenario E—4 MB, Scenario F—4 MB, Scenario G—4 MB.

Number of Scenarios: 7

Maximum partition size: 6 MB

Result: the scenarios were partitioned into two partitions: a) Partition #1: 5 MB; and b) Partition #2: 6 MB. Partition #1 will contain Scenario A, B and C while Partition #2 will contain Scenarios A, D, F and G While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer-implemented method for deleting data in a versioned database comprising versions, wherein each version is generated as data changes across the versioned database that differentiates versions, the method comprising:

generating, by a processor, a version visibility data structure (VVDS) for the versioned database that maps a version to a respective Version Scenario List (VSL) from a version graph and scenario structure of the versioned database, the VSL comprising a list of scenarios in the database that have access to a specific version in the versioned database memory, wherein each scenario is a logical pointer in the database that is independent of and points to the version in the database; wherein generating the VVDS comprises:

initializing, by the processor, the VVDS by setting a unique version as a key to an entry of the VVDS, and a respective empty VSL in the entry;

accessing, by the processor, the respective Scenario Version List (SVL); and iterating, by the processor, each entry in the VVDS from the list of all scenarios in the database and the respective SVL until there are no more unprocessed scenarios;

using the generated VVDS to determine, by the processor, each combination of feasible scenarios that when deleted, delete memory;

computing, by the processor, an amount of memory reclaimed by deleting each combination of feasible scenarios; and deleting, by the processor, one or more combinations of the computed scenarios to free up a specific amount of memory in the versioned database memory.

2. The computer-implemented method of claim 1, wherein initializing, by the processor, the VVDS by setting a unique version as a key to an entry of the VVDS and generating the VVDS comprises:

for a list of all versions in the database, marking the list of all versions in the database as unprocessed;

(a) selecting one of the unprocessed versions from the list of all versions as the key to the entry into the VVDS, and the empty VSL in the entry;

(b) marking the selected unprocessed version as processed; and repeating (a) and (b) until there are no more unprocessed versions from the list of all versions.

3. The computer-implemented method of claim 1, wherein iterating, by the processor, each entry in the VVDS from the list of all scenarios in the database and the respective SVL until there are no more unprocessed scenarios comprises:

for the list of all scenarios in the database and the respective SVL, marking the list of all scenarios in the database as unprocessed;

(a) selecting an unprocessed scenario from the list of all scenarios in the respective SVL;

(b) marking all the versions in the respective SVL as unprocessed; and (c) identifying and adding entries in the VVDS that correspond to the unprocessed versions from the respective SVL until all the scenarios from the list of scenarios are processed.

4. The computer-implemented method of claim 3, wherein identifying and adding entries in the VVDS that correspond to the unprocessed versions from the respective SVL until all the scenarios from the list of scenarios are processed comprises:

(c1) selecting an unprocessed version from the respective SVL;

(c2) identifying the entry in the VVDS that corresponds to the selected unprocessed version;

(c3) adding the entry in the VVDS that corresponds to selected unprocessed scenario into the VSL entry of the VVDS;

(c4) marking the selected unprocessed version as processed; and (c5) repeating (c1) through (c4) until there are no more unprocessed versions in the respective scenario's SVL;

(c6) marking the selected scenario as processed; and repeating (c5) and (c6) until there are no more unprocessed scenarios.

5. The computer-implemented method of claim 1, wherein determining each combination of feasible scenarios comprises: for each entry in the VVDS, obtaining, by the processor, a combination of scenarios in the VSL of each entry.

6. The computer-implemented method of claim 5, wherein determining each combination of feasible scenarios for each entry in the VVDS further comprises:

(a) marking each entry in the VVDS as unprocessed;

(b) selecting an unprocessed entry in the VVDS that has a version and the respective VSL, wherein the VSL corresponding to the unprocessed entry is a feasible combination of scenarios that deletion of which can reclaim memory;

(c) aggregating the feasible combinations into a combination list;

(d) marking the selected entry in the VVDS as processed;

(e) repeating (a) through (d) until each entry in the VVDS is processed; and returning a list of the feasible combinations.

7. The computer-implemented method of claim 1, wherein computing, by the processor, an amount of memory reclaimed by deleting each combination of feasible scenarios comprises:

generating the VVDS for a set of scenarios;

marking all entries in the VVDS as unprocessed, selecting an unprocessed entry of the VVDS;

marking all the scenarios in the corresponding VSL as unprocessed;

selecting each unprocessed scenario within the VSL;

determining if each unprocessed scenario in the VSL is in the set of scenarios in the VVDS until there are no further scenarios to process from the corresponding VSL;

determining by the processor, an amount of memory used by the corresponding version;

processing and determining the amounts of memory from the remaining unprocessed VVDS entries until all of the VVDS entries are processed; and returning an accumulated memory accumulated from the determined amounts of memory.

8. A system for deleting data in a versioned database comprising:

a processor; and a memory storing instructions that, when executed by the processor, configure the system to:

generate, by a processor, a version visibility data structure (VVDS) for the versioned database that maps a version to a respective Version Scenario List (VSL) from a version graph and scenario structure of the versioned database, the VSL comprising a list of scenarios in the database that have access to a specific version in the versioned database memory, wherein each scenario is a logical pointer in the database that is independent of and points to the version in the database; wherein generating when generating the VVDS, the system is configured to:

initialize, by the processor, the VVDS by setting a unique version as a key to an entry of the VVDS, and a respective empty VSL in the entry;

access, by the processor, a respective Scenario Version List (SVL); and iterate, by the processor, each entry in the VVDS from the list of all scenarios in the database and the respective SVL until there are no more unprocessed scenarios;

use the generated VVDS to determine, by the processor, each combination of feasible scenarios that when deleted, delete memory;

compute, by the processor, an amount of memory reclaimed by deleting each combination of feasible scenarios; and delete, by the processor, one or more combinations of the computed scenarios to free up a specific amount of memory in the versioned database memory.

9. The system of claim 8, wherein when initializing the VVDS by setting a unique version as a key to an entry of the VVDS and generating the VVDS, the system is further configured to:

for a list of all versions in the database, marking, by the processor, the list of all versions in the database as unprocessed;

(a) select, by the processor, one of the unprocessed versions from the list of all versions as the key to the entry into the VVDS, and the empty VSL in the entry;

(b) mark, by the processor, the selected unprocessed version as processed; and repeat (a) and (b) until there are no more unprocessed versions from the list of all versions.

10. The system of claim 8, wherein when iterating, by the processor, each entry in the VVDS from the list of all scenarios in the database and the respective SVL until there are no more unprocessed scenarios, the system is further configured to:

for the list of all scenarios in the database and the respective SVL, mark, by the processor, the list of all scenarios in the database as unprocessed;

(a) select, by the processor, an unprocessed scenario from the list of all scenarios in the respective SVL;

(b) mark, by the processor, all the versions in the respective SVL as unprocessed; and (c) identify and add, by the processor, entries in the VVDS that correspond to the unprocessed versions from the respective SVL until all the scenarios from the list of scenarios are processed.

11. The system of claim 10, wherein when identifying and adding entries in the VVDS that correspond to the unprocessed versions from the respective SVL until all the scenarios from the list of scenarios are processed, the system is further configured to:

(c1) select, by the processor, an unprocessed version from the respective SVL;

(c2) identify, by the processor, the entry in the VVDS that corresponds to the selected unprocessed version;

(c3) add, by the processor, the entry in the VVDS that corresponds to selected unprocessed scenario into the VSL entry of the VVDS;

(c4) mark, by the processor, the selected unprocessed version as processed; and (c5) repeat (c1) through (c4) until there are no more unprocessed versions in the respective scenario's SVL;

(c6) mark, by the processor, the selected scenario as processed; and repeating (c5) and (c6) until there are no more unprocessed scenarios.

12. The system of claim 8, wherein when determining each combination of feasible scenarios, the system is further configured to:

for each entry in the VVDS, obtain, by the processor, a combination of scenarios in the VSL of each entry.

13. The system of claim 8, wherein when determining each combination of feasible scenarios, the system is further configured to:

(a) mark, by the processor, each entry in the VVDS as unprocessed;

(b) select, by the processor, an unprocessed entry in the VVDS that has a version and the respective VSL, wherein the VSL corresponding to the unprocessed entry is a feasible combination of scenarios that deletion of which can reclaim memory;

(c) aggregate, by the processor, the feasible combinations into a combination list;

(d) mark, by the processor, the selected entry in the VVDS as processed;

(e) repeat (a) through (d) until each entry in the VVDS is processed; and return a list of the feasible combinations.

14. The system of claim 13, wherein when computing, by the processor, an amount of memory reclaimed by deleting each combination of feasible scenarios, the system is further configured to:

generate, by the processor, the VVDS for a set of scenarios;

mark all entries in the VVDS as unprocessed, select, by the processor, an unprocessed entry of the VVDS;

mark, by the processor, all the scenarios in the corresponding VSL as unprocessed;

select, by the processor, each unprocessed scenario within the VSL;

determine, by the processor, if each unprocessed scenario in the VSL is in the set of scenarios in the VVDS until there are no further scenarios to process from the corresponding VSL;

determine, by the processor, by the processor, an amount of memory used by the corresponding version;

process and determine, by the processor, the amounts of memory from the remaining unprocessed VVDS entries until all of the VVDS entries are processed; and return, by the processor, an accumulated memory accumulated from the determined amounts of memory.

15. A non-transitory computer-readable storage medium, the computer-readable storage medium including instructions that when executed by a computer:

a processor; and a memory storing instructions that, when executed by the processor, configure the system to:

generate, by a processor, a version visibility data structure (VVDS) for the versioned database that maps a version to a respective Version Scenario List (VSL) from a version graph and scenario structure of the versioned database, the VSL comprising a list of scenarios in the database that have access to a specific version in the versioned database memory, wherein each scenario is a logical pointer in the database that is independent of and points to the version in the database; wherein generating when generating the VVDS, the system is configured to:

initialize, by the processor, the VVDS by setting a unique version as a key to an entry of the VVDS, and a respective empty VSL in the entry;

access, by the processor, a respective Scenario Version List (SVL);

iterate, by the processor, each entry in the VVDS from the list of all scenarios in the database and the respective SVL until there are no more unprocessed scenarios;

use the generated VVDS to determine, by the processor, each combination of feasible scenarios that when deleted, delete memory;

compute, by the processor, an amount of memory reclaimed by deleting each combination of feasible scenarios; and delete, by the processor, one or more combinations of the computed scenarios to free up a specific amount of memory in the versioned database memory.

16. The non-transitory computer-readable storage medium of claim 15, wherein when initializing the VVDS by setting a unique version as a key to an entry of the VVDS and generating the VVDS, the instructions that when executed by the computer, cause the computer to:

for a list of all versions in the database, mark, by the processor, the list of all versions in the database as unprocessed;

(a) select, by the processor, one of the unprocessed versions from the list of all versions as the key to the entry into the VVDS, and the empty VSL in the entry;

(b) mark, by the processor, the selected unprocessed version as processed; and repeat (a) and (b) until there are no more unprocessed versions from the list of all versions.

17. The non-transitory computer-readable storage medium of claim 15, iterating, by the processor, each entry in the VVDS from the list of all scenarios in the database and the respective SVL until there are no more unprocessed scenarios, the instructions that when executed by the computer, cause the computer to:

for the list of all scenarios in the database and the respective SVL, mark, by the processor, the list of all scenarios in the database as unprocessed;

(a) select, by the processor, an unprocessed scenario from the list of all scenarios in the respective SVL;

(b) mark, by the processor, all the versions in the respective SVL as unprocessed; and (c) identify and add, by the processor, entries in the VVDS that correspond to the unprocessed versions from the respective SVL until all the scenarios from the list of scenarios are processed.

18. The non-transitory computer-readable storage medium of claim 17, wherein when identifying and adding entries in the VVDS that correspond to the unprocessed versions from the respective SVL until all the scenarios from the list of scenarios are processed, the system is further configured to:

(c1) select, by the processor, an unprocessed version from the respective SVL;

(c2) identify, by the processor, the entry in the VVDS that corresponds to the selected unprocessed version;

(c3) add, by the processor, the entry in the VVDS that corresponds to selected unprocessed scenario into the VSL entry of the VVDS;

(c4) mark, by the processor, the selected unprocessed version as processed; and (c5) repeat (c1) through (c4) until there are no more unprocessed versions in the respective scenario's SVL;

(c6) mark, by the processor, the selected scenario as processed; and repeating (c5) and (c6) until there are no more unprocessed scenarios.

19. The non-transitory computer-readable storage medium of claim 15, wherein when determining each combination of feasible scenarios, the instructions that when executed by the computer, cause the computer to:

(a) mark, by the processor, each entry in the VVDS as unprocessed;

(b) select, by the processor, an unprocessed entry in the VVDS that has a version and the respective VSL, wherein the VSL corresponding to the unprocessed entry is a feasible combination of scenarios that deletion of which can reclaim memory;

(c) aggregate, by the processor, the feasible combinations into a combination list;

(d) mark, by the processor, the selected entry in the VVDS as processed;

(e) repeat (a) through (d) until each entry in the VVDS is processed; and return a list of the feasible combinations.

20. The non-transitory computer-readable storage medium of claim 19, when computing, by the processor, an amount of memory reclaimed by deleting each combination of feasible scenarios, the instructions that when executed by the computer, cause the computer to:

generate, by the processor, the VVDS for a set of scenarios;

mark, by the processor, all entries in the VVDS as unprocessed, select an unprocessed entry of the VVDS;

mark, by the processor, all the scenarios in the corresponding VSL as unprocessed;

select, by the processor, each unprocessed scenario within the VSL;

determine, by the processor, if each unprocessed scenario in the VSL is in the set of scenarios in the VVDS until there are no further scenarios to process from the corresponding VSL;

determine, by the processor, by the processor, an amount of memory used by the corresponding version;

process and determine, by the processor, the amounts of memory from the remaining unprocessed VVDS entries until all of the VVDS entries are processed; and return an accumulated memory accumulated from the determined amounts of memory.

* * * * *